US010944748B2

(12) United States Patent
Fargano et al.

(10) Patent No.: US 10,944,748 B2
(45) Date of Patent: Mar. 9, 2021

(54) CONSUMER CHOICE FOR BROADBAND APPLICATION AND CONTENT SERVICES

(71) Applicant: CenturyLink Intellectual Property LLC, Denver, CO (US)

(72) Inventors: Michael J. Fargano, Louisville, CO (US); Charles I. Cook, Louisville, CO (US); Kevin M. McBride, Lone Tree, CO (US); John T. Pugaczewski, Hugo, MN (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 301 days.

(21) Appl. No.: 15/925,351

(22) Filed: Mar. 19, 2018

(65) Prior Publication Data

US 2018/0205735 A1 Jul. 19, 2018

Related U.S. Application Data

(62) Division of application No. 14/601,891, filed on Jan. 21, 2015, now Pat. No. 9,954,861.

(60) Provisional application No. 61/930,772, filed on Jan. 23, 2014, provisional application No. 61/929,804, filed on Jan. 21, 2014.

(51) Int. Cl.
| | |
|---|---|
| *H04L 29/06* | (2006.01) |
| *G06Q 20/12* | (2012.01) |
| *G11B 20/00* | (2006.01) |
| *H04L 12/24* | (2006.01) |

(52) U.S. Cl.
CPC ......... *H04L 63/10* (2013.01); *G06Q 20/1235* (2013.01); *G11B 20/00731* (2013.01); *H04L 41/509* (2013.01); *H04L 63/0245* (2013.01); *H04L 65/4084* (2013.01); *H04L 2209/60* (2013.01); *H04L 2209/603* (2013.01)

(58) Field of Classification Search
CPC ........ G11B 20/00731; G11B 20/00739; G11B 20/00797; G11B 20/00804
See application file for complete search history.

(56) References Cited

U.S. PATENT DOCUMENTS

| | | |
|---|---|---|
| 9,548,859 B2 | 1/2017 | Medvinsky |
| 9,954,861 B2 | 4/2018 | Fargano et al. |

(Continued)

*Primary Examiner* — Daniel B Potratz
(74) *Attorney, Agent, or Firm* — Lumen Patent Firm

(57) ABSTRACT

Novel tools and techniques might provide for implementing application, service, and/or content access control. Based at least in part on a consumer's choice of applications, services, content, and/or content providers—particular in exchange for a subsidy on content and/or network access fees provided to the consumer by chosen content providers—, a computing system may determine whether access to applications, services, and/or content not associated with the chosen content providers ("other content") should be allowed or restricted. If restricted, the computing system might utilize various network access techniques and/or technologies to block the consumer's access to the other content, to allow access to the other content on a charge per access basis, or to allow access to the other content at reduced network access speeds. In some embodiments, an access provider (e.g., an Internet service provider, etc.) might perform both determination and implementation of content access and restriction.

18 Claims, 23 Drawing Sheets

(56) References Cited

U.S. PATENT DOCUMENTS

| | | | |
|---|---|---|---|
| 2003/0005133 A1* | 1/2003 | Banerjee | G06Q 10/10 709/229 |
| 2013/0325609 A1* | 12/2013 | Sokolov | G06Q 50/184 705/14.54 |
| 2014/0280498 A1 | 9/2014 | Frankel | |
| 2015/0163150 A1* | 6/2015 | Beheshti-Zavareh | H04L 45/02 370/400 |
| 2015/0207699 A1 | 7/2015 | Fargano et al. | |

* cited by examiner

CONSUMER CHOICE FOR BROADBAND APPLICATION AND CONTENT SERVICES

CROSS-REFERENCES TO RELATED APPLICATIONS

This application is a divisional application of U.S. patent application Ser. No. 14/601,891 filed Jan. 21, 2015 (the "'891 Application") filed Jan. 21, 2015 by Michael J. Fargano which claims priority to U.S. patent application Ser. No. 61/929,804 (the "'804 application"), filed Jan. 21, 2014 by Michael J. Fargano, entitled, "Consumer Choice for Broadband Application and Content Services" and to U.S. Patent Application Ser. No. 61/930,772 (the "'772 application"), filed Jan. 23, 2014 by Michael J. Fargano, entitled, "Consumer Choice for Broadband Application and Content Services."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing application, service, and/or content access control, and, in particular embodiments, to methods, systems, and computer software for implementing application, service, and/or content access control, based at least in part on a consumer's choice of applications, services, content, and/or content providers.

BACKGROUND

Until recently, in typical network or content access settings, access providers (e.g., Internet service providers ("ISPs"), and the like) were bound by the concept of net-neutrality to avoid or prevent discrimination in terms of content delivery and content access on the Internet, as prescribed in the FCC's Open Internet rules. Under the FCC rules, consumers were not given options with regard to Internet and/or content access on the Internet. The core "anti-blocking" and "anti-discrimination" elements of the FCC's Open Internet rules, however, were recently struck down by the U.S. Court of Appeals for the District of Columbia in Verizon v. FCC, Case No. 11-1355.

Consumers, in exchange for certain benefits (e.g., partial or full subsidies for broadband Internet services), may be willing to accept certain blocking or discrimination (in terms of restriction in access) during content or Internet access. However, such options have to date not been made available to the consumers. The underlying technologies and techniques for implementing such consumer-choice-based blocking or discrimination are likewise unavailable.

From $3^{rd}$ party provider perspectives, ISPs and other access providers typically have not provided, and do not have, the underlying technologies for allowing $3^{rd}$ party providers to control certain aspects of the ISPs' network, especially technologies that may enable $3^{rd}$ party control for implementing such consumer-choice-based blocking or discrimination.

Hence, there is a need for more robust and scalable solutions for implementing application, service, and/or content access control, based at least in part on a consumer's choice of applications, services, content, and/or content providers.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
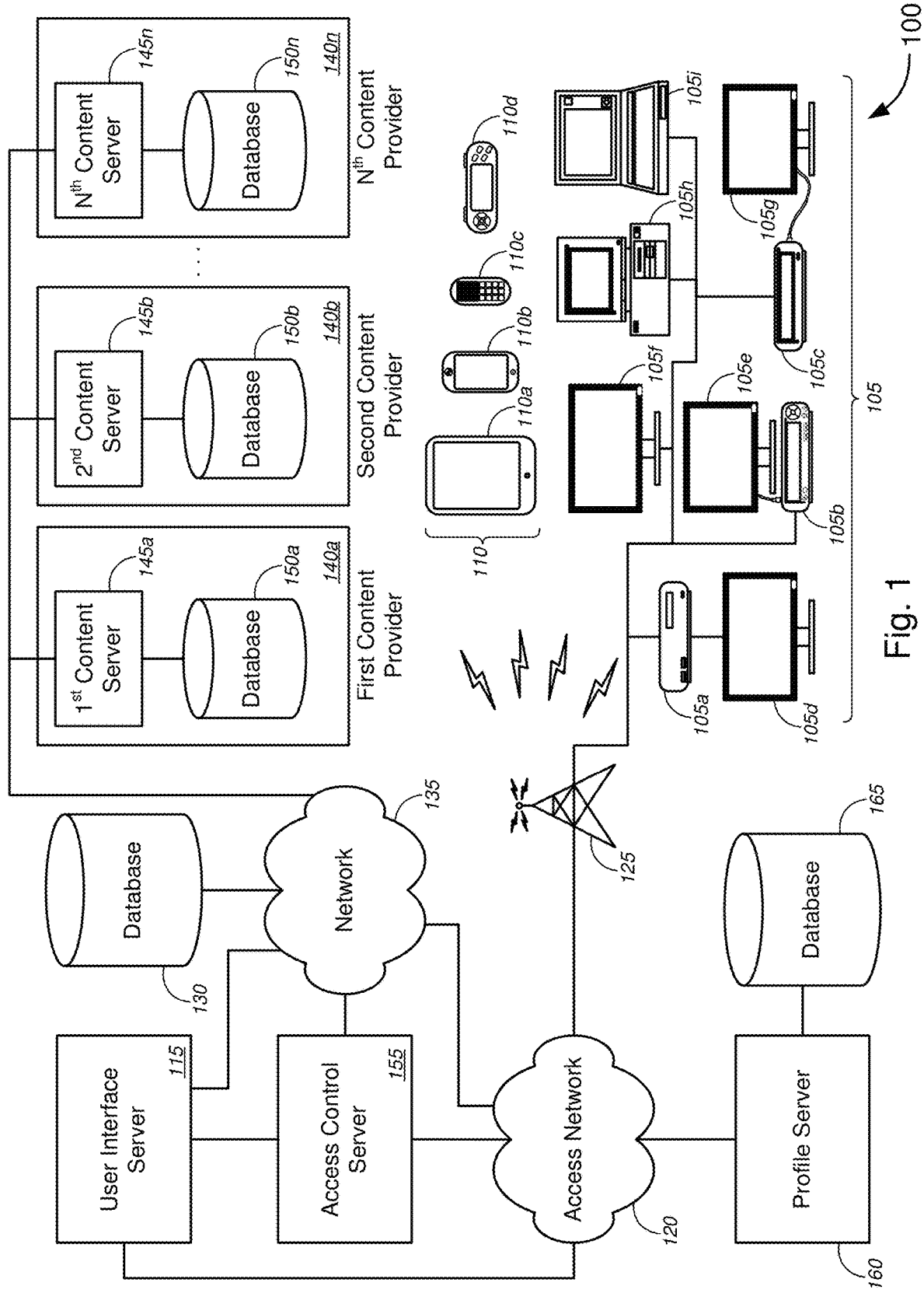
FIG. 1 is a schematic diagram illustrating a system for implementing application and/or content access control, based at least in part on a consumer's choice of applications, content, and/or content providers, in accordance with various embodiments.

Various embodiments provide techniques for implementing application, service, and/or content access control.

In some embodiments, based at least in part on a consumer's choice of applications, services, content, and/or $3^{rd}$ party provider(s)—particular in exchange for a subsidy or discount on content and/or network access fees provided to the consumer by chosen $3^{rd}$ party provider(s) (or based on other incentives)—, a computing system may determine whether access to applications, services, and/or content not associated with the chosen $3^{rd}$ party provider(s) (i.e., "other content") should be allowed or restricted. If allowed, the computing system might allow access as normal. If restricted, however, the computing system might utilize various network access/restriction techniques and/or technologies to block the consumer's access to the other content, to allow access to the other content but on a charge per access basis, or to allow access to the other content but at reduced network access speeds, or the like. In some embodiments, an access provider (e.g., an Internet service provider, etc.) might perform both determination and implementation of content access and restriction.

The various network access/restriction techniques and/or technologies might include, without limitation, application aware network management on per subscriber basis, software defined networking ("SDN"), deep packet inspection ("DPI"), network functions virtualization ("NFV") with management and orchestration functions, at least one of service chaining graphs or service forwarding graphs, a virtual and/or hardware-based "walled garden" software platform or system, and/or the like. For example, SDN, DPI, NFV, and/or the walled garden platform or system might allow for blocking or steering during user access of unselected, unsanctioned, or otherwise inappropriate websites, webpages, (network) services, applications, content, and/or the like (collectively, "other content," which, in some cases, may be associated with competitors of the $3^{rd}$ party provider(s) with whom the user has a subsidy/access agreement), based on the agreement(s) between the user and (each of) the $3^{rd}$ party provider(s).

According to some embodiments, a virtual and/or hardware-based walled garden software platform or system may be implemented to restrict a user's access to content, applications, and/or services (collectively, "content") that are not associated with a $3^{rd}$ party provider with whom the user has agreed (based on express contract or informal agreement, or the like) to accept a subsidy in exchange for limited or restricted network or content access. In some instances, the subsidy might include a partial or full subsidy for the user's Internet access (e.g., broadband access, optical fiber access, high-speed access, etc.), purchasing deals or discounts toward purchase or rental of products, content, applications, and/or services associated with the $3^{rd}$ party (or an affiliate of the $3^{rd}$ party), purchasing points toward purchase or rental of products, content, applications, and/or services associated with the $3^{rd}$ party (or an affiliate of the $3^{rd}$ party), or any other suitable form of incentive, and/or the like. In some cases, a total walled garden may be implemented in which access, by the user, to all content associated with competitors of the $3^{rd}$ party provider are restricted. In some cases, a partial walled garden may be implemented, in which only a small list of competitors and/or a small list of content associated certain competitors are access-restricted to the user, based at least in part on the agreement between the user and the $3^{rd}$ party provider. The number of competitors on the list may be based on an agreement (and/or subscription) between the $3^{rd}$ party provider and the access provider. An expanded walled garden may be implemented to cover a larger section of the network that is accessible by the user.

In one non-limiting set of examples, Internet browser company A might agree to (partially or fully) subsidize broadband Internet access (through ISP B) for user C, in exchange for user C agreeing to use only company A's Internet browser and not any of the products, services, content, and/or applications associated with any of company A's competitors. In some cases, ISP B might provide the network functionalities for ensuring that the user C remains restricted from the content associated with competitors of company A, while at the same time enabling company A to pay for at least a portion (if not all) of the costs of user C's broadband Internet access through ISP B. If user C attempts to use Internet browser company D's browser or through a browser search (using company's A's browser) lands on a website associated with company D, then one of the following situations might arise, in accordance with the agreement between company A and user C or in accordance with dynamic, accessible restriction settings made available to company A (e.g., via API, portal, or the like): blocking user C's access to company D's browser or website; allowing user C to access company D's browser or website, but on a charge per access basis (implemented either as an actual charge per access (e.g., 1 cent, 2 cents, 5 cents, 10 cents, 25 cents, etc. per access) or as a percentage or reduction of the subsidy paid by company A, or the like); allowing user C to access company D's browser or website, but at a reduced network access speed (although normal network access speeds are restored when user C is not accessing content, websites, applications, products, and/or services of competitors of company A); or the like. In some cases, blocking access might include preventing the user C from accessing company D's browser or website, by actively steering the user C to a browser or website associated with company A (or other sanctioned or acceptable browser or website, such as that of an affiliate or partner company of company A). In some instances, steering may be implemented at the edge of the network, including, but not limited to, a business/residential gateway, an access node, a border network gateway, a network interface device, a digital subscriber line access multiplexer ("DSLAM"), edge routers, and/or the like.

In some embodiments, ISP B might provide company A with an API, virtual network functions as a service ("VNFaaS") functionality, portal, and/or the like to access, modify, maintain, and/or control aspects of the agreement between the company A and user C, the network functionalities, and/or the types (and extent) of restriction (including, modifying access control list(s) associated with user C, modifying the types of competitors, modifying the list of known competitors, modifying the types of products, services, content, and/or applications to be restricted, and/or the like). In some cases, the API, VNFaaS functionality, portal, and/or the like might allow a plurality of users having subsidy/access agreements with company A to be grouped or classified into one or more classes of users, and might allow company A to simultaneously access, modify, maintain, and/or control aspects of the agreements between the company A and each user in a class of users, by accessing, modifying, maintaining, and/or controlling aspects of agreements for the class of users. Grouping or classification might be based on similarities in terms of the agreements between company A and each user, in terms of demographics of the users, in terms of types of restrictions, in terms of subsidy levels, and/or the like.

With the functionalities above, a consumer may be provided with significant benefits, in terms of savings and the like (for Internet services) in exchange for certain (agreed upon) limitations on content or Internet access. Where the consumers are already loyal to the $3^{rd}$ party provider, such limitations on content or Internet access (i.e., which are associated with competitors of the $3^{rd}$ party provider) may not effectively amount to much of a disadvantage. In certain circumstances, in fact, subsidies and other incentives for such loyal consumers may amount to rewards for loyalty by the $3^{rd}$ party provider, rather than a restriction (per se) on the loyal consumer's content or Internet access.

From the $3^{rd}$ party provider perspective, APIs, portals, VNFaaS, and/or the like provided by access provider enable more direct and assertive control of the $3^{rd}$ party provider's delivery of content, applications, and/or services to consumers, as well as more direct and assertive control over access by consumers of the $3^{rd}$ party provider's content, applications, and/or services.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, network access (and/or restriction) technology, network configuration technology, and/or the like. In other aspects, certain embodiments, can improve the functioning of a computer system itself (e.g., computing devices or systems that form parts of the network, computing devices or systems for performing the functionalities described below, etc.), for example, by enabling implementation of subsidy payment and account-linking between a user and $3^{rd}$ party providers, enabling implementation of content/services/applications access determination, enabling implementation of content/services/applications access or restriction, enabling implementation of virtual gateway functionalities for performing one or more of these implementations, enabling implementation of virtualization functionalities for performing one or more of these implementations, and/or the like. In particular, to the extent any abstract concepts are present in the various embodiments, those concepts can be implemented as described herein by devices, software, systems, and methods that involve specific novel functionality (e.g., steps or operations), such as implementing subsidy payment and account-linking between a user and $3^{rd}$ party providers, implementing content/services/applications access determination, implementing content/services/applications access or restriction, implementing virtualization functionalities for performing these implementations, enabling VNFaaS functionality for enabling a 3rd party provider to access, maintain, modify, and/or control aspects of an access provider's network or computing systems, and/or the like, to name a few examples, that extend beyond mere conventional computer processing operations. This functionality can produce tangible results outside of the implementing computer system, including, merely by way of example, blocking a user's access to certain content, applications, and/or services over a network, enabling a user to access certain content, applications, and/or services over a network on a charge per access basis, reducing network access speeds for a user while accessing certain content, applications, and/or services over a network, enabling a $3^{rd}$ party provider more direct and assertive control of the $3^{rd}$ party provider's delivery of content, applications, and/or services to consumers through the access provider's network and/or computing systems, and/or the like.

In an aspect, a method may provide for a marketplace for consumers to choose at least one of content or content providers. The method might comprise providing, with a first computer, a user interface for a user to choose content or content providers and receiving, at a second computer over a network via the first computer and via the user interface, a selection from the user of at least one of one or more first content or one or more content providers. The one or more first content might be associated with the one or more content providers. The method might also comprise receiving, at the second computer, a request from the user to access one or more second content and determining, with the second computer, whether the one or more second content is associated with the one or more content providers. The method might comprise, based on a determination that the one or more second content is associated with the one or more content providers, relaying the request to a third computer to allow the user access to the one or more second content. The method might further comprise, based on a determination that at least one second content of the one or more second content is not associated with any of the one or more content providers, restricting access, by the user, to the at least one second content.

In some embodiments, the one or more first content and the one or more second content might each comprise at least one of applications, video content, audio content, image content, game content, website content, Internet search result content, application services, media content services, on-line services, or tangible services associated with one or more of application services, media content services, and/or on-line services. In some cases, the first computer might comprise a user device selected from a group consisting of a tablet computer, a smart phone, a mobile phone, a portable gaming device, a laptop computer, a desktop computer, a gaming console, a television, a digital video recorder, a set-top box, a media content presentation device, and a mobile user device interface apparatus. According to some embodiments, the user interface might comprise a web portal. The second computer and the third computer, in some cases, might be the same computer. In some instances, at least one of the second computer or the third computer might be a server computer associated with an access provider. The access provider, in some embodiments, might be an Internet service provider, and, in exchange for one of a partial subsidy or a full subsidy, provided to the user by the one or more content providers, for Internet services for the user, the user might agree to be subject to restricted Internet service access to content associated with competitors of the one or more content providers, the restricted Internet access being implemented by the Internet service provider.

According to some embodiments, the at least one second content might comprise at least one of website content, Internet search result content, Internet-based media content services, or on-line services. Restricting access, by the user, to the at least one second content, based on a determination that at least one second content of the one or more second content is not associated with any of the one or more content providers, might comprise one of: blocking user access to the at least one of website content, Internet search result content, Internet-based media content services, or on-line services; allowing user access to the at least one of website content, Internet search result content, Internet-based media content services, or on-line services, on a charge per access basis; or allowing user access to the at least one of website content, Internet search result content, Internet-based media content services, or on-line services, at reduced network access speeds.

In another aspect, another method might provide for a marketplace for consumers to choose at least one of content or content providers. The method might comprise receiving, at a first computer, a request from a user to access one or more first content, determining, with the first computer, whether access, by the user, to content that is not associated with one or more content providers should be restricted, and determining, with the first computer, whether the one or more first content is associated with the one or more content providers. The method might also comprise, based on a determination that the one or more first content is associated with the one or more content providers, relaying the request to a second computer to allow the user access to the one or more first content. The method might further comprise, based on a determination that at least one first content of the one or more first content is not associated with any of the one or more content providers and based on a determination that access, by the user, to content that is not associated with one or more content providers should be restricted, restricting access, by the user, to the at least one first content.

In some embodiments, the method might further comprise providing, with a third computer, a user interface for the user to choose content or content providers and receiving, at the third computer and via the user interface, a selection from the user of at least one of one or more second content or the one or more content providers. The one or more second content might be associated with the one or more content providers. The method might also comprise storing, by the third computer and in a database over a network, the selection from the user of at least one of the one or more second content or the one or more content providers. According to some embodiments, determining, with the first computer, whether access, by the user, to content that is not associated with one or more content providers should be restricted might comprise determining, with the first computer, whether access, by the user, to content that is not associated with one or more content providers should be restricted, based at least in part on the selection from the user of at least one of one or more second content or the one or more content providers.

In some cases, determining, with the first computer, whether access, by the user, to content that is not associated with one or more content providers should be restricted might comprise accessing, with the first computer and from a database over a network, a user profile associated with the user and determining, with the first computer, whether the user profile indicates that the user has entered into a content access agreement with one or more content providers. In some instances, at least one of the first computer or the second computer might be a server computer associated with an Internet service provider, and the content access agreement might provide that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

In alternative embodiments, determining, with the first computer, whether access, by the user, to content that is not associated with one or more content providers should be restricted might comprise accessing, with the first computer, an access control list associated with at least one of the user or devices associated with the user and determining, with the first computer, whether content that is not associated with any of the one or more content providers should be restricted, based at least in part on the access control list. In some cases, restricting access, by the user, to the at least one first content might comprise one of blocking user access to the at least one first content, allowing user access to the at least one first content on a charge per access basis, and/or allowing user access to the at least one first content at reduced network access speeds, based at least in part on a determination that content that is not associated with any of the one or more content providers should be restricted. Such determination might be based on the access control list associated with at least one of the user or devices associated with the user.

According to some embodiments, the method might further comprise providing, with a fourth computer, virtual network functions as a service ("VNFaaS") functionality to the one or more content providers to enable the one or more content providers to provide updated access control lists associated with at least one of the user or devices associated with the user. In some instances, the method might also comprise providing, with the fourth computer, the updated access control lists associated with at least one of the user or devices associated with the user to a plurality of routers and servers in the network, using operations support systems ("OSS"). The plurality of routers and servers might contribute to at least one of providing access to the one or more first content or restricting access to the at least one of the one or more first content.

In some embodiments, the one or more first content might each comprise at least one of applications, video content, audio content, image content, game content, website content, Internet search result content, application services, media content services, on-line services, or tangible services associated with one or more of application services, media content services, and/or on-line services, or the like. In some cases, restricting access, by the user, to the at least one first content might comprise blocking user access to the at least one first content. In some instances, restricting access, by the user, to the at least one first content might comprise allowing user access to the at least one first content on a charge per access basis. In other cases, restricting access, by the user, to the at least one first content might comprise allowing user access to the at least one first content at reduced network access speeds.

Alternatively, restricting access, by the user, to the at least one first content might comprise controlling delivery of the at least one first content. Controlling delivery of the at least one first content might comprise at least one of implementing application aware network management on per subscriber basis, implementing software defined networking ("SDN"), implementing deep packet inspection ("DPI"), implementing network functions virtualization ("NFV") with management and orchestration functions, implementing at least one of service chaining graphs or service forwarding graphs, implementing a virtual and/or hardware-based "walled garden" software platform or system, and/or the like.

The first computer, in some embodiments, might be a computer associated with an access provider. The first computer might host a network functions virtualization infrastructure ("NFVI") platform, on which at least one of an application or a virtual network function ("VNF") that is associated with at least one content provider of the one or more content providers is run. At least one of determining whether access, by the user, to content that is not associated with one or more content providers should be restricted, determining whether the one or more first content is associated with the one or more content providers, relaying the request to a second computer to allow the user access to the one or more first content, and/or restricting access, by the user, to the at least one first content might be performed by the at least one of the application or the VNF running on the NFVI platform hosted on the first computer.

In yet another aspect, an apparatus might comprise a non-transitory computer readable medium having encoded thereon a set of instructions executable by one or more computers to perform one or more operations. The set of instructions might comprise instructions for receiving a request from a user to access one or more first content, instructions for determining whether access, by the user, to content that is not associated with one or more content providers should be restricted, and instructions for determining whether the one or more first content is associated with the one or more content providers. The set of instructions might also comprise instructions for, based on a determination that the one or more first content is associated with the one or more content providers, relaying the request to a second apparatus to allow the user access to the one or more first content. The set of instructions might further comprise instructions for, based on a determination that at least one first content of the one or more first content is not associated with any of the one or more content providers and based on a determination that access, by the user, to content that is not associated with one or more content providers should be restricted, restricting access, by the user, to the at least one first content.

In still another aspect, a computer system might comprise one or more processors and a non-transitory computer readable medium in communication with the one or more processors. The computer readable medium might have encoded thereon a set of instructions executable by the one or more processors to cause the computer system to perform one or more operations. The set of instructions might comprise instructions for receiving a request from a user to access one or more first content, instructions for determining whether access, by the user, to content that is not associated with one or more content providers should be restricted, and instructions for determining whether the one or more first content is associated with the one or more content providers. The set of instructions might also comprise instructions for, based on a determination that the one or more first content is associated with the one or more content providers, relaying the request to a second apparatus to allow the user access to the one or more first content. The set of instructions might further comprise instructions for, based on a determination that at least one first content of the one or more first content is not associated with any of the one or more content providers and based on a determination that access, by the user, to content that is not associated with one or more content providers should be restricted, restricting access, by the user, to the at least one first content.

In another aspect, a method might comprise providing, with a first computer, a user interface for a content provider to select content to offer subscribers and to enter terms of subscriber offers. The method might further comprise configuring, with the first computer, one or more second computers to control delivery of the content, based at least in part on selection from the content provider of content to offer subscribers and terms of subscriber offers.

In some cases, the first computer might be associated with an Internet service provider, and the terms of subscriber offers might comprise one set of terms providing that, in exchange for one of a partial subsidy or a full subsidy, provided to a subscriber by the content provider, for Internet services for the subscriber, the subscriber agrees to be subject to restricted Internet service access to content associated with competitors of the content provider, the restricted Internet access being implemented by the Internet service provider.

Various modifications and additions can be made to the embodiments discussed without departing from the scope of the invention. For example, while the embodiments described above refer to particular features, the scope of this invention also includes embodiments having different combination of features and embodiments that do not include all of the above described features.

The U.S. Court of Appeals for the District of Columbia struck down the core "anti-blocking" and "anti-discrimination" elements of the FCC's Open Internet rules, in Verizon v. FCC, Case No. 11-1355, which was decided Jan. 14, 2014 and argued Sep. 9, 2013), and is available, via the opinion locator functionality, at www.cadc.uscourts.gov. Given this decision and the options for regulators and stakeholders, there is an opportunity to provide for various levels of a virtual marketplace where consumers can choose applications and content providers via an Internet service provider's ("ISP's") (or other access provider's) portal or via a third-party's portal (in the case where multiple ISPs are part the consumer choice). There could be bundles of application and content providers and/or sources; this can be provided along with levels of broadband service (e.g., bit rates, Internet speeds, etc.), or the like).

These consumer choices can have subsidies provided by the application and content providers and/or sources that are applied as a discount toward the consumer's charge for broadband service; purchasing deals or purchasing points, or the like, could also be another form of incentive. In some cases, broadband service could be 100% subsidized—with very limited application and content provider choices made available to the consumer in exchange for the subsidy. This approach would have an overall positive response by cost-conscious consumers and may provide for vigorous competition among large application and content providers. Regarding small and upstart application and content providers, some level of minimal access could be allowed for.

For network management and control, e.g., for large scale applications, the following techniques and/or technologies, among other similar techniques and/or technologies, can facilitate the control of applications and content delivery: application aware network management on per subscriber basis; Software Defined Networking ("SDN"); Deep Packet Inspection ("DPI"); Network Functions Virtualization ("NFV") with Management and Orchestration; Service Chaining/Forwarding Graphs; and/or the like.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

In some embodiments, rather than (or in addition to) a VM system, containers may be utilized for virtualization functionalities. A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "advanced intelligent network" ("AIN") might refer to any telephone network that queries a database before a telephone call is sent to its final destination in order to determine how to handle or route the call. A typical AIN might provide the following two main functionalities: (1) the AIN might be able to affect or change the routing of calls within it from moment to moment, based on some criteria; and (2) the AIN might allow the originator or the ultimate receiver of the call to somehow inject intelligence into the network to affect the flow of the outbound or inbound call. Typically, AINs might comprise signal control points ("SCPs"), signal switching points ("SSPs"), and signal transfer points ("STPs"), all of which might communicate via out-of-band signaling, using, for example, signaling system 7 ("SS7") protocol. SCPs are typically computers that hold databases in which customer-specific information used by the network for routing calls might be stored. SSPs are typically digital telephone switches that communicate with SCPs to request for customer-specific instructions pertaining to call completion. STPs are typically packet switches that shuttle messages between SSPs and SCPs.

An "application programming interface" ("API") might refer to a protocol intended to be used as an interface by software components to communicate with each other.

Figure 2:
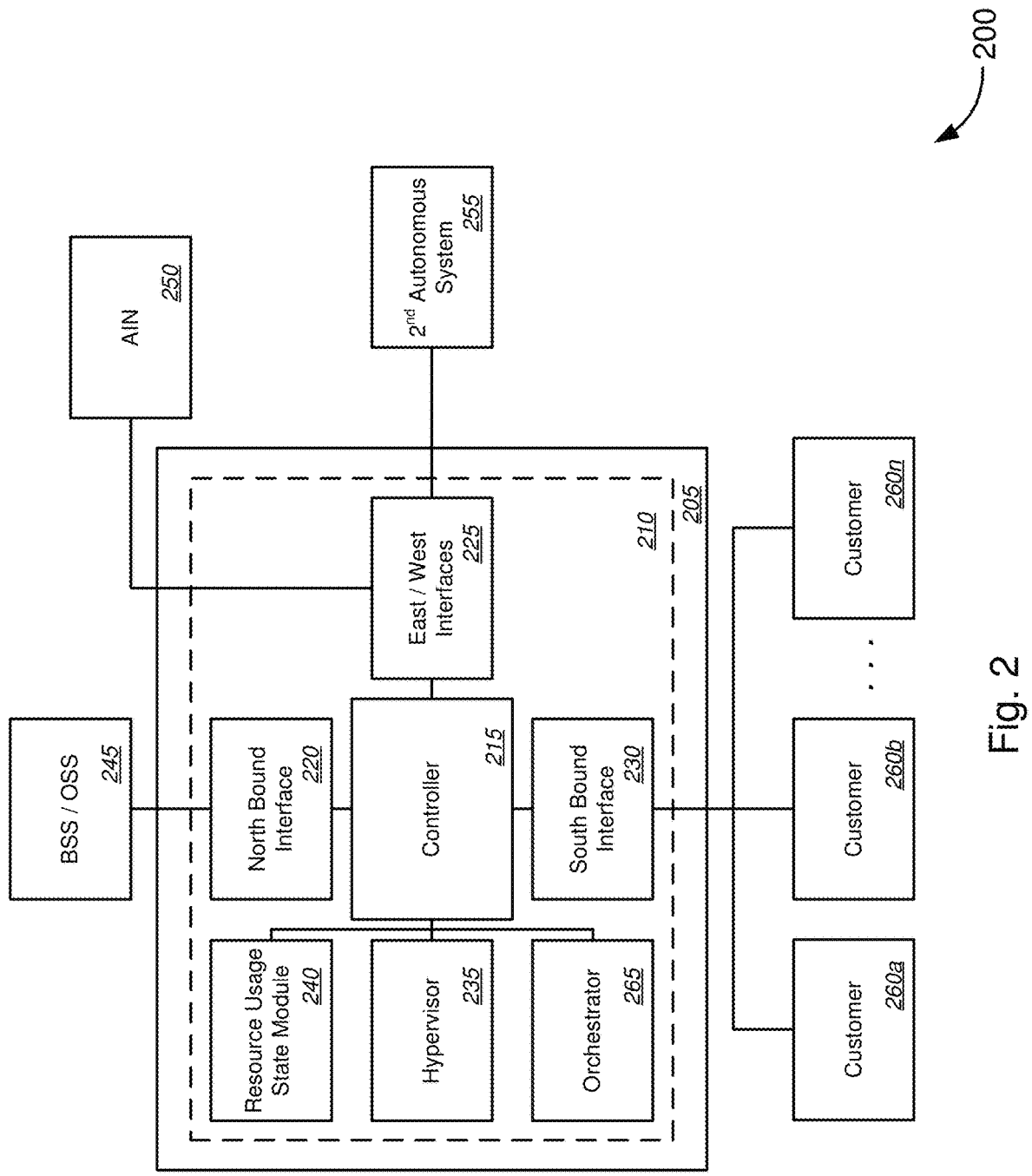
FIG. 2 is a block diagram illustrating a system for controlling virtualization congestion and for implementing application and/or content access control, based at least in part on a consumer's choice of applications, content, and/or content providers, in accordance with various embodiments.

"Virtualization" might refer to a process of mapping hardware resources to create "virtual machine resource" within the framework of the VMs so that the VM environment may utilize the hardware resources. For example, each of the north, south, east, and west interfaces shown in FIG. 2 are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running. FIG. 2 refers to a virtualization congestion control frameworks as described in detail in U.S. patent application Ser. No. 14/531,000 (the "'000 application"), filed Nov. 3, 2014 by Michael K.

Bugenhagen, entitled, "Physical to Virtual Network Transport Function Abstraction" and U.S. patent application Ser. No. 14/061,147 (the "'147 application"), filed Oct. 23, 2013 by Michael K. Bugenhagen, entitled, "Virtualization Congestion Control Framework," which is a continuation-in-part application of U.S. patent application Ser. No. 14/060,450 (the "'450 application"), filed Oct. 22, 2013 by Michael K. Bugenhagen, entitled, "Virtualization Congestion Control Framework," the entire disclosures of which are incorporated herein by reference in their entirety for all purposes. One or more infrastructure components of these virtualization congestion control frameworks may, in some non-limiting embodiment, be utilized in implementing physical to virtual network transport function abstraction, as discussed in the '000 application.

Specific Exemplary Embodiments

We now turn to the embodiments as illustrated by the drawings. FIGS. 1-13 illustrate some of the features of the method, system, and apparatus for implementing application and/or content access control, based at least in part on a consumer's choice of applications, content, and/or content providers, as referred to above. The methods, systems, and apparatuses illustrated by FIGS. 1-13 refer to examples of different embodiments that include various components and steps, which can be considered alternatives or which can be used in conjunction with one another in the various embodiments. The description of the illustrated methods, systems, and apparatuses shown in FIGS. 1-13 is provided for purposes of illustration and should not be considered to limit the scope of the different embodiments.

With reference to the figures, FIG. 1 is a general schematic diagram illustrating a system 100 for implementing application and/or content access control, based at least in part on a consumer's choice of applications, content, and/or content providers, in accordance with various embodiments. In FIG. 1, system 100 might comprise one or more user devices 105 associated with a user. The one or more user devices 105 might comprise gaming console 105a, digital video recording and playback device ("DVR") 105b, set-top or set-back box ("STB") 105c, one or more television sets ("TVs") 105d-105g, desktop computer 105h, laptop computer 105i, and one or more mobile user devices 110. The one or more TVs 105d-105g might include any combination of a high-definition ("HD") television, an Internet Protocol television ("IPTV"), and a cable television, or the like, where one or both of HDTV and IPTV may be interactive TVs. The one or more mobile user devices 110 might comprise one or more tablet computers 110a, one or more smart phones 110b, one or more mobile phones 110c, or one or more portable gaming devices 110d, and/or the like. The one or more user devices 105, in some cases, might further comprise a media content presentation device (other than those listed above; not specifically shown), a mobile user device interface apparatus (other than those listed above; also not specifically shown), and/or the like.

System 100 might further comprise a user interface server(s) 115 communicatively coupled to the one or more user devices 105 via access network 120, and in some cases via one or more telecommunications relay systems 125. The one or more telecommunications relay systems 125 might include, without limitation, one or more wireless network interfaces (e.g., wireless modems, wireless access points, and the like), one or more towers, one or more satellites, and the like. System 100 might further comprise database(s) 130 in communication with user interface server(s) 115.

In some embodiments, system 100 might further comprise network 135 and one or more third party content providers 140. The one or more third party content providers 140—which might be in communication with user interface server(s) 115 via network 135—might include, without limitation, first content provider 140a, second content provider 140b, through $N^{th}$ content provider 140n, each of which might provide content each comprising at least one of applications (or software applications or "apps"), video content, audio content, image content, game content, website content, Internet search result content, and/or the like. In some cases, each of the first content provider 140a, the second content provider 140b, through the $N^{th}$ content provider 140n might provide services each comprising at least one of application services, media content services, on-line services, or tangible services associated with one or more of application services, media content services, on-line services, and/or the like. Each of the one or more third party content providers 140 might have a content server(s) 145 and an associated database 150. For example, the first content provider 140a might have a first content server(s) 145a, which might be in communication with database(s) 150a (either local to or remote from the first content server 145a). The second content provider 140b might have a second content server(s) 145b, which might be in communication with database(s) 150b (either local to or remote from the first content server 145b). And so on.

According to some embodiments, system 100 might also comprise access control server(s) 155 that determine whether to allow access or to restrict access, by a user associated with the one or more user devices 105, to content or services provided by a content provider 140, based at least in part on a user's or consumer's choice of applications, content, and/or content providers. The access control server(s) 155 might, in some instances, be communicatively coupled with a profile server(s) 160 and/or database(s) 165 (via network 120 or 135). The profile server(s) 160 might determine whether a user profile associated with the user is stored in database(s) 165. If so, profile server(s) 160 might access the database(s) 165 and retrieve the user profile associated with the user, and might determine whether the user profile indicates that the user has entered into a content access agreement with at least one content provider of the one or more content providers 140. In a non-limiting example, the content access agreement might provide that, in exchange for one of a partial subsidy and/or a full subsidy, provided to the user by the one or more content providers, for Internet services for the user, the user agrees to be subject to restricted Internet service access to content associated with competitors of the one or more content providers, the restricted Internet access being implemented by an access provider (e.g., an Internet service provider, a telecommunications company, a mobile communications company, and/or the like) that is associated with the access control server(s) 155.

In some embodiments, alternative or additional to allowing or restricting access based at least in part on the user's user profile (which may be indicative of the user's choice of applications, content, and/or content providers), access control server(s) 155 might determine whether to allow access or to restrict access, by the user (associated with the one or more user devices 105), to content or services provided by a content provider 140, based at least in part on an access control list ("ACL") associated with at least one of the user or the one or more user devices 105 associated with the user. For example, the access control server(s) 155 might access the ACL associated with at least one of the user or the one or more user devices 105 associated with the user from a database (e.g., database 130 or database 165). The access control server(s) 155 might subsequently determine whether content or services associated with one or more of the content providers should be restricted, based at least in part on the ACL.

In either of these embodiments, if it is determined that content or services should be restricted, the access control server(s) 155 might restrict access to the content or services by performing one of blocking user access to the content or services, allowing user access to the content or services but on a charge per access basis, or allowing user access to the content or services but at reduced network access speeds, where restriction of access may be based at least in part on the user's choice of applications, content, and/or content providers as indicated in the user's user profile and/or based at least in part on the access control list. In some instances, blocking user access to the content or services might include, without limitation, blocking traffic, ports, uniform resource identifiers ("URIs"; each of which includes uniform resource name ("URN") and/or uniform resource locator ("URL")), and/or the like. In some cases, restricting access to the content or services might include controlling delivery of the content or services, which might include, without limitation, one or more of implementing application aware network management on per subscriber basis, implementing software defined networking ("SDN"), implementing deep packet inspection ("DPI"), implementing network functions virtualization ("NFV") with management and orchestration functions, and/or implementing at least one of service chaining graphs or service forwarding graphs, implementing a virtual and/or hardware-based "walled garden" software platform or system, or the like.

Merely by way of example, in some aspects, the user interface server(s) 115 and/or the access control server(s) 155, or the like, might provide virtual network functions as a service ("VNFaaS") functionality to any of the one or more $3^{rd}$ party content providers 140 to provide updated access control lists associated with the user or associated with user devices associated with the user. In some cases, the updated access control lists might be provided to a plurality of routers and/or servers in the network, using operations support systems ("OSS") or the like, the plurality of routers and/or servers contributing to at least one of providing access to the content or services or restricting access to the content or services. VNFaaS functionality may also provide other ways for the one or more $3^{rd}$ party content providers 140 to control access and/or delivery of their content, applications, and/or services, by enabling the one or more $3^{rd}$ party providers 140 to access, modify, maintain, and/or control aspects of the agreement between the $3^{rd}$ party provider and a user, the network functionalities, and/or the types (and extent) of restriction. The types and/or extent of restriction may include, without limitation, modifying access control list(s) associated with a user, modifying the types of competitors, modifying a list of known competitors, modifying the types of products, services, content, and/or applications to be restricted, and/or the like.

In operation, one or more of the user interface server(s) 115, the third party content server(s) 145, the access control server(s) 155, and/or the profile server(s) 160 might perform the methods described in detail with respect to FIGS. 6-11 below.

FIG. 2 is a block diagram illustrating a system 200 for controlling virtualization congestion and for implementing application and/or content access control, based at least in part on a consumer's choice of applications, content, and/or content providers, in accordance with various embodiments.

In the embodiment of FIG. 2, system 200 might comprise computer or hardware system 205. Computer or hardware system 205, in some embodiments, might serve as a host machine or host system that creates and/or operates a virtual environment (or virtual machine environment) 210, in which a controller 215 might run. The controller 215 might be operatively coupled to a number of interfaces or components, including, but not limited to, a north or north bound interface 220, east/west or east/west bound interfaces 225, south or south bound interface 230, a hypervisor 235, a resource usage state module 240, and an orchestrator 265, some or all of which might be executed within the virtual environment 210.

System 200 might further comprise a BSS/OSS 245, an AIN 250, one or more second autonomous systems 255, and one or more customers 260. In some embodiments, second autonomous systems 255 might include a computer or hardware system that might be similar to, identical to, or different from computer or hardware system 205. The one or more customers 260 might include customers 260a, 260b, through 260n. Each of customers 260a, 260b, through 260n might comprise a customer device including, but not limited to, POTS telephones, voice over Internet protocol ("VoIP") telephones, cellular telephones, smart phones, tablet computers, laptop computers, desktop computers, or the like.

Computer or hardware system 205 and the second autonomous systems 255 might be located in another service provider network, or might be physically different systems not inside the VM environment but still in the service provider facilities or premises, and might be associated with one or more of VoIP switches, Internet protocol television ("IPTV") servers, content delivery network ("CDN") servers, Internet servers, other network servers, and the like. In some cases, the computer or hardware system 205 and/or the second autonomous systems 255 might comprise one or more of VoIP servers or switches, IPTV servers, content servers (in a CDN), Internet servers, SS7 nodes, and/or other AIN elements, other network servers, and the like (each of which could be running as an application on a VM within the virtual environment 210). In a particular aspect, such servers can be implemented as applications within a VM or multiple separate VMs on the hardware system 205 and/or the second autonomous systems 255.

As an example, a first customer (e.g., customer 260a) might communicate with a second customer (e.g., customer 260b) via telephone through AIN 250 via a first application (e.g., a VoIP server or switch) running on a first VM within the virtual environment 210 running on the computer or hardware system 205, via the south bound interface 230 and the east/west interface 225. Meanwhile, a third customer (e.g., customer 260n) might be streaming a high-definition ("HD") movie via an IPTV server associated with one of the one or more second autonomous systems 255 via a second application running on a second VM within the virtual environment 210, via the south bound interface 230 and the east/west interface 225. At the same time, the BSS/OSS 245 might be providing business and/or operational support to one or more customers and customer connections via a third application running on a third VM within the virtual environment 210, via the north bound interface 220 and the south bound interface 230. In some aspects, the first, second, and third VMs might be the same VM, or any two of the first, second, or third VMs might be the same VM. In other aspects, the first, second, and third VMs are separate VMs.

Unlike a conventional hypervisor, the orchestrator 265 might coordinate with the resource usage state module 240 (i.e., by communicating with it) to identify the maximum hardware resources of the host system 205, as well as the currently used hardware resources and the currently available resources. Based on such identifications or determinations, the orchestrator 265 might regulate, rather than simply allocate, hardware resources (e.g., CPU memory storage resources, and the like) that might be used by the applications running on the one or more VMs in the virtual environment 210. In other words, the orchestrator 265 might establish bounds for resources allocated to each application based on these determinations, and perhaps based on priority or importance of each application. For example, government and/or emergency service applications (including, but not limited to, Government Emergency Telecommunications Service ("GETS"), or the like) might be given top priority and provided with all the available hardware resources in lieu of other lower priority applications. In some cases, the orchestrator 265 might push back on the excessive hardware resource usage by the one or more applications. According to some embodiments, the orchestrator 265 might provide the one or more applications with a mechanism for controlling push back (see, for example, the buffer utilization feedback discussed in the '000, '147, and '450 applications (already incorporated herein). System 200 (or at least one or more infrastructure elements of these systems) may, in some embodiments, be utilized in implementing physical to virtual network transport function abstraction, as described in detail with respect to FIGS. 4-6 of the '000 application or FIG. 4 of U.S. patent application Ser. No. 14/583,952 (the "'952 application"), filed Dec. 29, 2014 by Michael K. Bugenhagen, entitled, "Multi-line/Multi-state Virtualized OAM Transponder," the entire disclosure of which is incorporated herein by reference in their entirety for all purposes.

Figure 3:
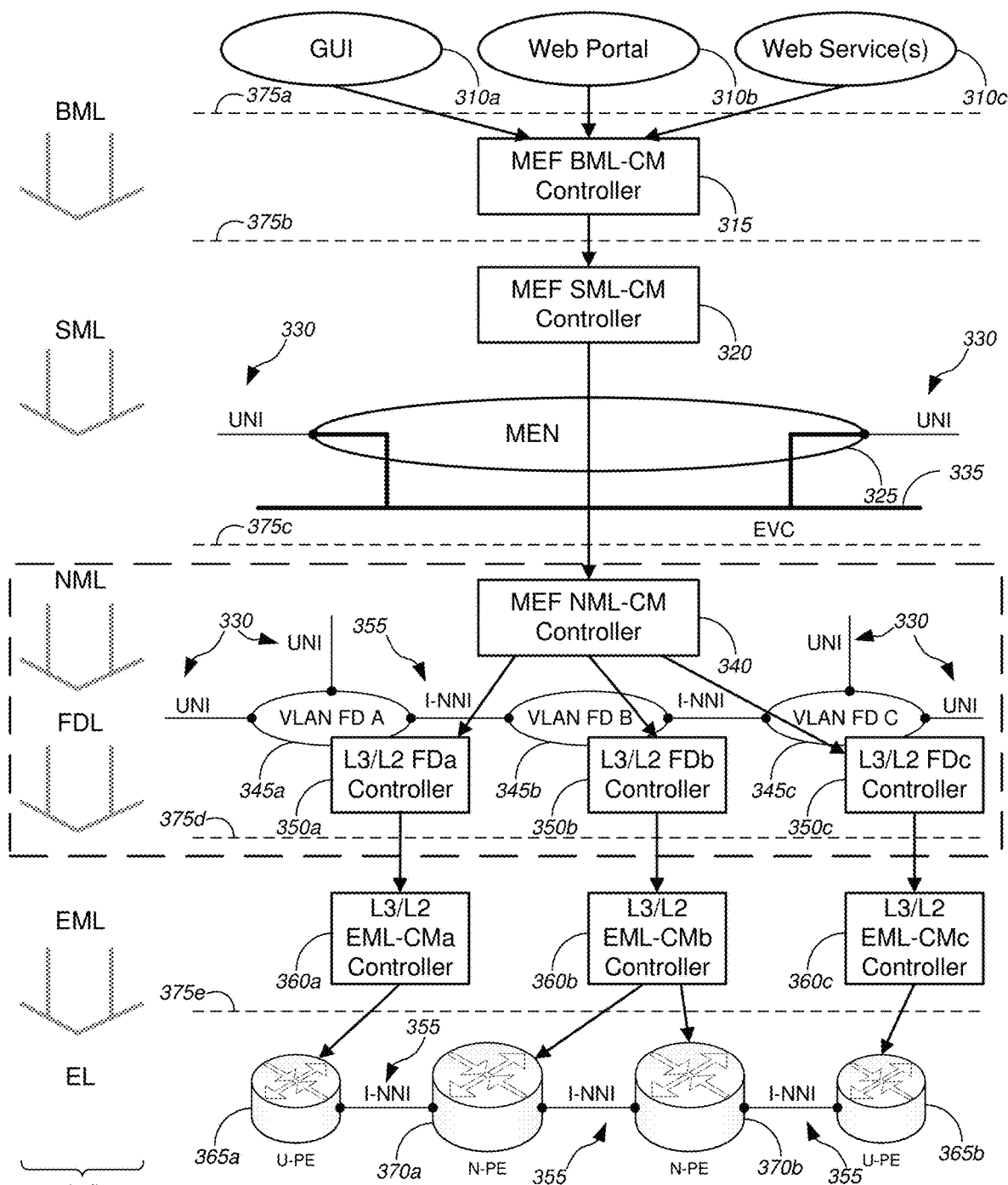
FIG. 3 is a schematic diagram illustrating a system representing network management layer-configuration management ("NML-CM") network logic that may be utilized for implementing application and/or content access control, based at least in part on a consumer's choice of applications, content, and/or content providers, in accordance with various embodiments.

FIG. 3 is a block diagram illustrating a system 300 representing network management layer-configuration management ("NML-CM") network logic, in accordance with various embodiments. In some cases, the NML-CM network logic may be utilized for implementing application and/or content access control, based at least in part on a consumer's choice of applications, content, and/or content providers. In FIG. 3, system 300 might comprise a plurality of layers 305, including, but not limited to, a business management layer ("BML"), a service management layer ("SML"), a network management layer ("NML"), a flow domain layer ("FDL"), an element management layer ("EML"), an element layer ("EL"), and/or the like. System 300 might further comprise a plurality of user-side or customer-side interfaces or interface devices 310, including, without limitation, one or more graphical user interfaces ("GUIs") 310*a*, one or more web portals 310*b*, one or more web services 310*c*, and/or the like.

In some embodiments, system 300 might further comprise a Metro Ethernet Forum ("MEF") business management layer-configuration management ("BML-CM") controller 315, which is located at the BML, and a MEF service management layer-configuration management ("SML-CM") controller 320, which is located at the SML. Also located at the SML might be a Metro Ethernet Network ("MEN") 325, the edges of which might be communicatively coupled to two or more user network interfaces ("UNIs") 330. In some cases, the two or more UNIs 330 might be linked by an Ethernet virtual connection or Ethernet virtual circuit ("EVC") 335. At the NML, system 300 might comprise a MEF network management layer-configuration management ("NML-CM") controller 340, while at the FDL, system 300 might comprise a plurality of virtual local area network ("VLAN") flow domains 345 and a plurality of flow domain controllers 350.

In some embodiments (such as shown in FIG. 3), the plurality of VLAN flow domains 345 might include, without limitation, a first VLAN flow domain A 345*a*, a second VLAN flow domain B 345*b*, and a third VLAN flow domain C 345*c*. A plurality of UNIs 330 might communicatively couple to edge VLAN flow domains, such as the first VLAN flow domain A 345*a* and the third VLAN flow domain C 345*c* (in the example of FIG. 3). The edge VLAN flow domains (i.e., the first VLAN flow domain A 345*a* and the third VLAN flow domain C 345*c*) might each communicatively couple with inner VLAN flow domains (i.e., the second VLAN flow domain B 345*b*) via one or more internal network-to-network interfaces ("I-NNI") 355. In some cases, each of the plurality of the flow domain controllers 350 might be part of the corresponding one of the plurality of VLAN flow domains 345. In some instances, each of the plurality of the flow domain controllers 350 might be separate from the corresponding one of the plurality of VLAN flow domains 345, although communicatively coupled therewith; in some embodiments, each separate flow domain controller 350 and each corresponding VLAN flow domain 345 might at least in part be co-located. In the example of FIG. 3, flow domain a controller 350*a* might be part of (or separate from, yet communicatively coupled to) the first VLAN flow domain A 345*a*, while flow domain b controller 350*b* might be part of (or separate from, yet communicatively coupled to) the second VLAN flow domain B 345*b*, and flow domain c controller 350*c* might be part of (or separate from, yet communicatively coupled to) the third VLAN flow domain C 345*c*. According to some embodiments, the plurality of flow domain controllers 350 might include layer 3/layer 2 ("L3/L2") flow domain controllers 350. As understood in the art, "layer 3" might refer to a network layer, while "layer 2" might refer to a data link layer.

At the EML, system 300 might further comprise a plurality of L3/L2 element management layer-configuration management ("EML-CM") controllers 360. As shown in the embodiment of FIG. 3, the plurality of L3/L2 EML-CM controllers 360 might comprise a first L3/L2 EML-CM a controller 360*a*, a second L3/L2 EML-CM b controller 360*b*, and a third L3/L2 EML-CM c controller 360*c*. Each of the plurality of L3/L2 EML-CM controllers 360 might communicatively couple with a corresponding one of the plurality of L3/L2 flow domain controllers 350. Each L3/L2 EML-CM controller 360 might control one or more routers at the EL. For example, as shown in FIG. 3, the first L3/L2 EML-CM a controller 360*a* might control a first user-side provider edge ("U-PE") router 365*a*, while the second L3/L2 EML-CM b controller 360*b* might control two network-side provider edge ("N-PE") routers 370*a* and 370*b*, and the third L3/L2 EML-CM c controller 360*c* might control a second U-PE 365*b*. I-NNIs 355 might communicatively couple U-PE routers 365 with N-PE routers 370, and communicatively couple N-PE routers 370 to other N-PE routers 370.

In operation, a service request might be received by a GUI 310*a*, a web portal 310*b*, or a web service 310*c*. The service request might request performance of a service including, but is not limited to, service activation, service modification, service assurance, fault isolation, or performance monitoring, or the like. With respect to the embodiments of FIGS. 6-11, the service might include, without limitation, content/application/service access blocking, tracking of content/ application/service access for charging and/or network speed reduction, selective network speed reduction, services for providing $3^{rd}$ party provider control over (access provider's) network functionalities, and/or the like. Services for providing $3^{rd}$ party provider control over (access provider's) network functionalities might include, services for enabling a $3^{rd}$ party provider to access, modify, maintain, and/or control aspects of the agreement between the $3^{rd}$ party provider and a user, the network functionalities, and/or the types (and extent) of restriction. The types and/or extent of restriction may include, without limitation, modifying access control list(s) associated with a user, modifying the types of competitors, modifying a list of known competitors, modifying the types of products, services, content, and/or applications to be restricted, and/or the like.

The MEF BML-CM controller 315 receives the service request and forwards to the MEF SML-CM controller 320, which then sends the service request to the MEF NML-CM controller 340 (via MEN 325). The MEF NML-CM controller 340 receives the service request, which might include information regarding the UNIs 330 and the EVC(s) 335 (e.g., vectors of the UNIs 330 and the EVC(s) 335, or the like), and might utilize a flow domain algorithm to generate flow domain information, which might be received and used by the L3/L2 flow domain controllers 350 to control the VLAN flow domains 345 and/or to send control information to the L3/L2 EML-CM controllers 360, which in turn controls the U-PEs 365 and/or N-PEs 370 at the element layer. The functions of the NML and the FDL (as well as interactions between the NML/FDL and the EML or EL), in general, are described with respect to FIGS. 2-6 in U.S. patent application Ser. No. 14/462,778 (the "'778 Application"), filed Aug. 19, 2014 by John T. Pugaczewski, entitled, "Network Management Layer-Configuration Management," the entire disclosure of which is incorporated herein by reference in its entirety for all purposes.

Figure 4A:
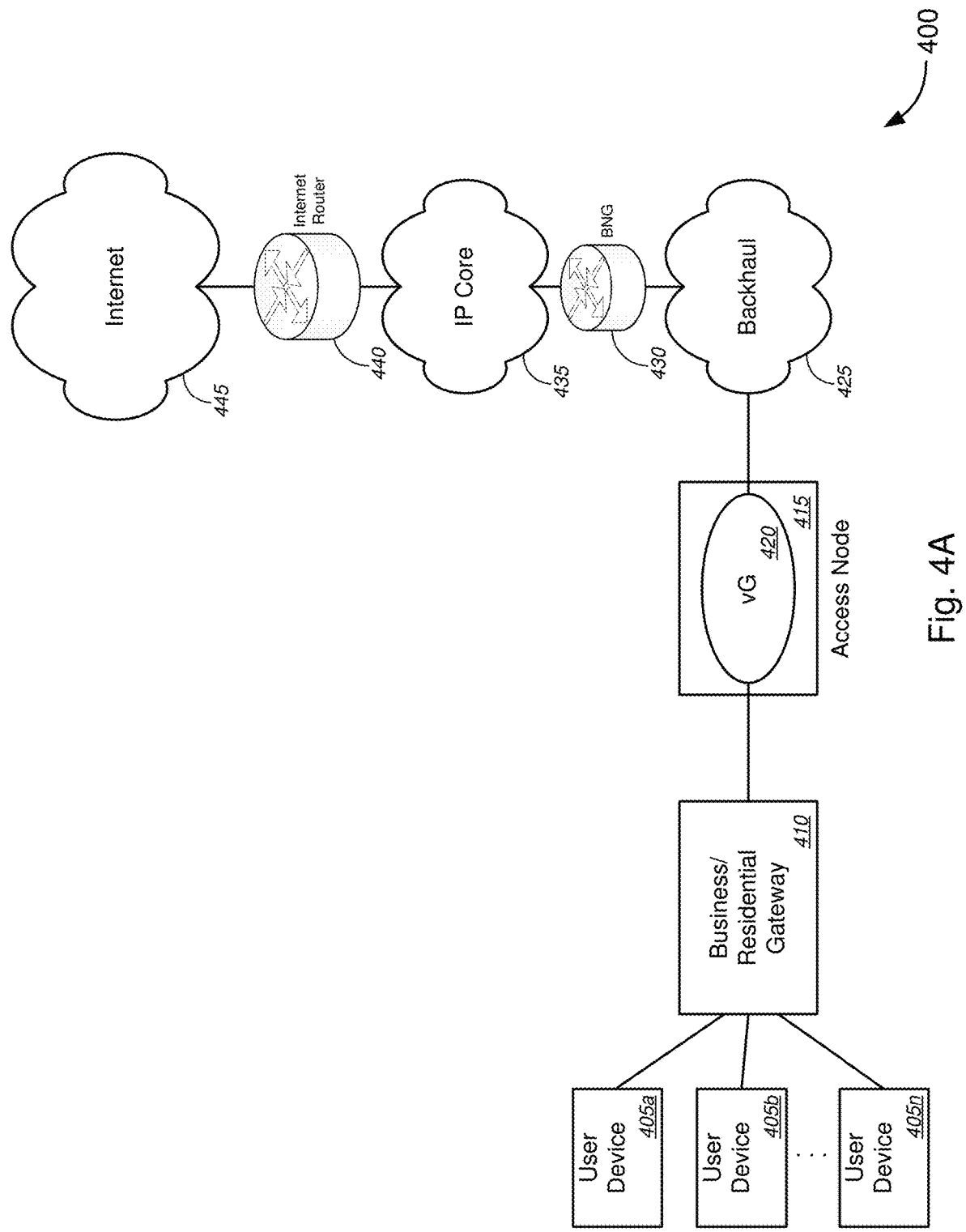
FIG. 4A is a general schematic diagram illustrating a system representing a network enhanced business and/or residential gateway architecture for implementing application and/or content access control, based at least in part on a consumer's choice of applications, content, and/or content providers, in accordance with various embodiments.
Figure 4B:
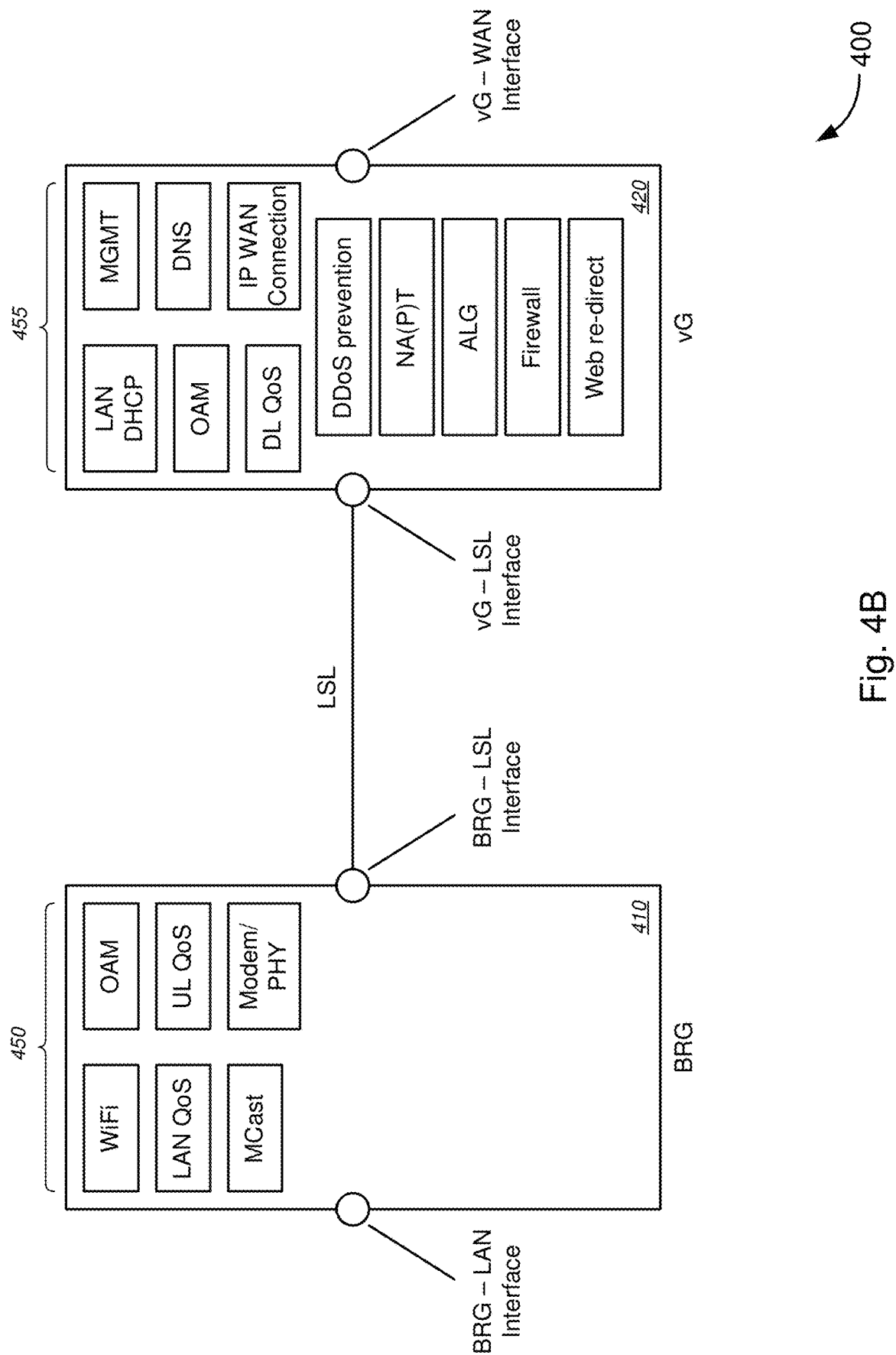
FIG. 4B is a general schematic diagram illustrating a system representing functional blocks for a business and/or residential gateway and for a virtual gateway that may be utilized for implementing application and/or content access control, based at least in part on a consumer's choice of applications, content, and/or content providers, in accordance with various embodiments.

FIGS. 4A and 4B (collectively, "FIG. 4") depict business and/or residential gateway ("BRG") and virtual gateway ("vG") systems, architecture, and/or functional blocks that may be utilized for implementing application and/or content access control, based at least in part on a consumer's choice of applications, content, and/or content providers, in accordance with various embodiments. FIG. 4A is a general schematic diagram illustrating a system 400 representing a network enhanced business and/or residential gateway architecture for implementing application and/or content access control, based at least in part on a consumer's choice of applications, content, and/or content providers, in accordance with various embodiments. FIG. 4B is a general schematic diagram illustrating a system 400 representing functional blocks for a business and/or residential gateway and for a virtual gateway that may be utilized for implementing application and/or content access control, based at least in part on a consumer's choice of applications, content, and/or content providers, in accordance with various embodiments.

In the embodiment of FIG. 4A, system 400 might comprise one or more user devices 405a-405n (collectively, "user devices 405"), which may, in some cases, be located within a customer premises, or, in other cases, may be mobile devices not limited in location. System 400 might further comprise a business or residential gateway ("BRG") 410, which is in communication with the one or more user devices 405. In some embodiments, the BRG 410 might be a gateway or gateway device that has been reduced to functions that cannot be virtualized—i.e., a "basic" gateway device. System 400 might further comprise an access node 415 and a virtual gateway ("vG") 420 located at the access node. The vG 420, in some cases, might contain all the functions (or most of the functions) of a gateway device that can be virtualized. The system 400 might further comprise a border network gateway ("BNG") 430. The access node 415 and the vG 420 might be communicatively coupled to the BRG 410 and might be communicatively coupled, via backhaul 425, to the BNG 430. In some cases, the vG 420 (or another vG) might be located at the BNG 430, or some other location within the network that is reachable by BRG 410 (as shown at the access node). The BNG 430 might be communicatively coupled to an Internet router 440 via IP core 435. The Internet router 440 allows the one or more user devices 405 to access the Internet 445 (via the BRG 410, the vG 420, and the BNG 430). In some embodiments, the BRG communications with the vG might utilize OpenFlow protocol 1.3 or higher, or other similar protocols, and the like.

With reference to FIG. 4B (and to FIG. 4A), the BRG 410 might have a BRG—local area network ("LAN") interface that allows the BRG 410 to communicatively couple to the one or more user devices 405. The BRG 410 might also have a BRG—logical subscriber link ("LSL") interface that allows the BRG 410 communicatively couple to the vG 420 via the LSL. Likewise, the vG 420 has a vG—LSL interface that allows the vG 410 to communicatively couple to the BRG 410 via the LSL. The vG 420 also has a vG—wide area network ("WAN") interface that allows the vG 420 to communicatively couple to the BNG 430 (e.g., via the backhaul 425, which may be a WAN, or the like).

In some embodiments, BRG 410 might include one or more functional blocks or gateway functional blocks 450, including, without limitation, a WiFi functional block, a LAN quality of service ("QoS") functional block, a multicast or MCast functional block, an operations, administration, and management ("OAM") functional block, an uplink ("UL") QoS functional block, a modem/physical layer ("modem/PHY") functional block, and/or the like. The vG 420 might include one or more functional blocks or gateway functional blocks 455, including, without limitation, a LAN dynamic host configuration protocol ("DHCP") functional block, an OAM functional block, a downlink ("DL") QoS functional block, a management functional block, a domain name system ("DNS") functional block, an Internet Protocol ("IP") WAN connection functional block, a distributed denial-of-service ("DDoS") prevention functional block, a network address (and port) translation ("NA(P)T") functional block, application-level or application layer gateway ("ALG") functional block, a firewall functional block, a web re-direct functional block, and/or the like.

Figure 5:
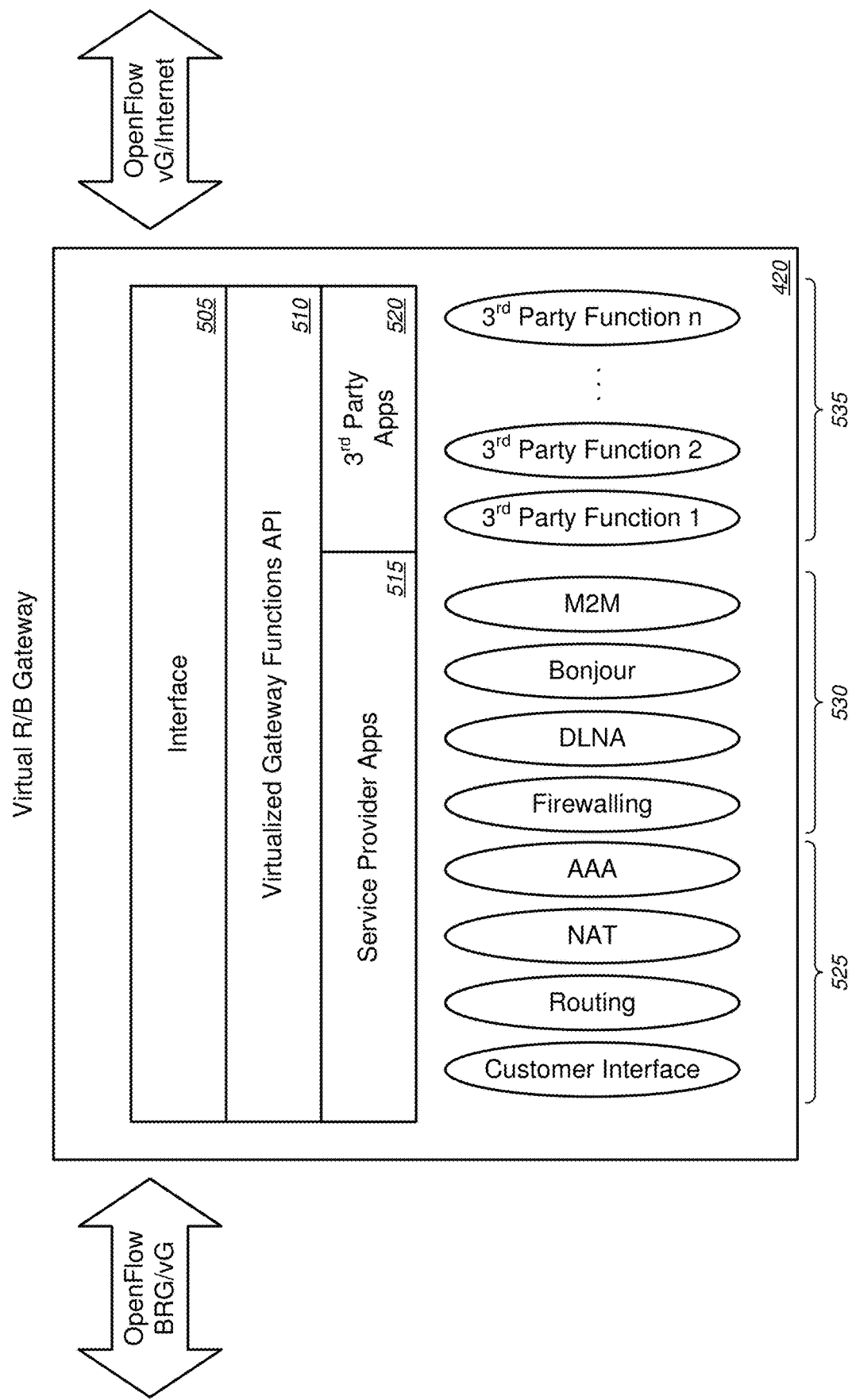
FIG. 5 is a schematic diagram illustrating a system representing a framework for implementing application and/or content access control, based at least in part on a consumer's choice of applications, content, and/or content providers, in accordance with various embodiments.

FIG. 5 is a schematic diagram illustrating a system 500 representing a framework for implementing application and/or content access control, based at least in part on a consumer's choice of applications, content, and/or content providers, in accordance with various embodiments.

In the embodiment of FIG. 5, system 500 might comprise vG (or virtual residential/business gateway) 420, which is similar, if not identical to, vG 420 in FIG. 4, might comprise interface 505, virtualized gateway functions application programming interface ("API") 510, one or more service provider applications ("apps") 515, and one or more $3^{rd}$ party apps 520. As described above with respect to FIG. 4, OpenFlow protocol might be used for data communications between the vG and the BRG, and between the vG and (ultimately) the Internet. The one or more service provider apps 515 might comprise one or more minimum virtualized functions 525, including, but not limited to, a customer interface function, a routing function, a network address translation ("NAT") function, an authentication, authorization, and accounting ("AAA") function, and/or the like. In some embodiments, the one or more service provider apps 515 might further comprise additional possible virtualized functions, which might include, but are not limited to, firewalling function, digital living network alliance ("DLNA") universal plug and play ("UPnP") function, Bonjour zero-configuration networking ("Zeroconf") function, machine-to-machine ("M2M") function, and/or the like. The $3^{rd}$ party apps 520 might include one or more functions, including $3^{rd}$ party function 1, $3^{rd}$ party function 2, through $3^{rd}$ party function n. This framework might allow for the technical implementation for supporting $3^{rd}$ party subsidy of a user's content and/or network access.

Merely by way of example, in some embodiments, a service provider might provide a set of functions that interface via an API to the gateway. A customer interface (or user interface) might provide customer-level customization. In some cases, an open API might provide access to $3^{rd}$ parties for the development of apps. Some service provider apps might be made available to $3^{rd}$ party developers through service-chaining, or the like. In some instances, the open API also enables $3^{rd}$ parties to subsidize and have access to subscribed-to aspects of per customer provisioning.

According to some embodiments, a split virtualized API may be specified for service provider control. A subset of that split API can be allocated for third-party access to enable development support of $3^{rd}$ party applications. In some cases, parts of the API might be directly accessible without requiring subscription. Alternatively, or additionally, parts of the API might require a subscription, and parts of the API might be billable. The API can, in some embodiments, orchestrate service chaining, or the like.

In some embodiments, to further enable support of $3^{rd}$ party subsidy of a user's content and/or network access, BRG—vG DPI and Internet—vG DPI may be utilized. In some cases, a service catalog and service mapping may also be implemented or utilized. Third party application API's or resulting apps can be added to the service catalog. According to some embodiments, the $3^{rd}$ party application API might include, without limitation, one or more of currently subscribed-to service attributes, maximum available service attributes (e.g., bandwidth, over-subscription level, etc.), subscription information, service billing interface, service assurance capabilities, interface provisioning (e.g., provisioning gated by billing interface and authentication), account creation and authentication, QoS capabilities, access to OpenStack, and/or the like.

Various methods for providing content access and/or restriction, and/or for provisioning capabilities for $3^{rd}$ party content provider subsidy of a user's content (including, without limitation, apps, content, and/or services) and/or network (e.g., Internet or other network) access are described below with respect to FIGS. 6A-11.

Figure 6A:
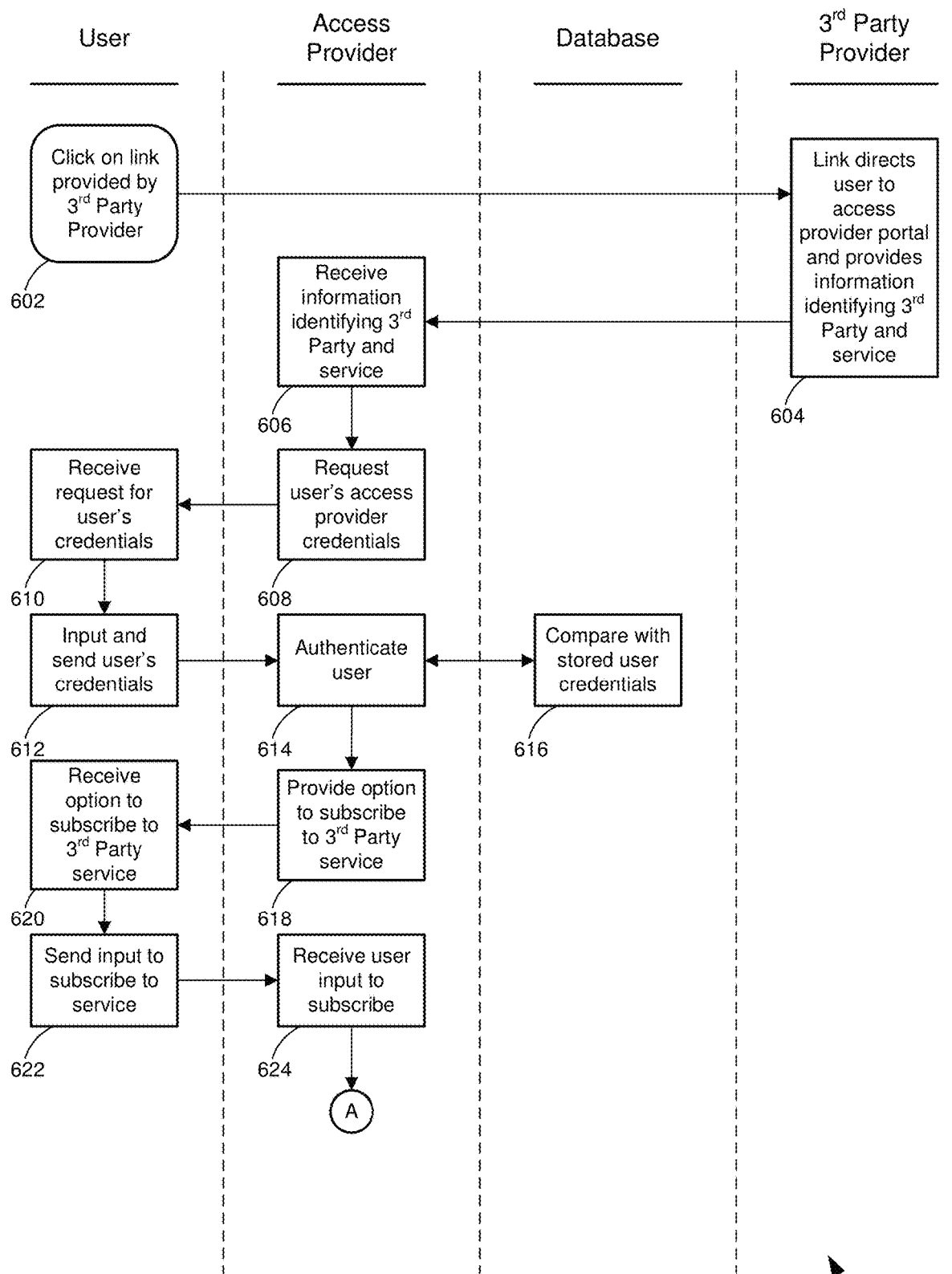
FIG. 6A-6C represent a system flow diagram illustrating a method for implementing application and/or content access control, based at least in part on a consumer's choice of applications, content, and/or content providers, in accordance with various embodiments.
Figure 6B:
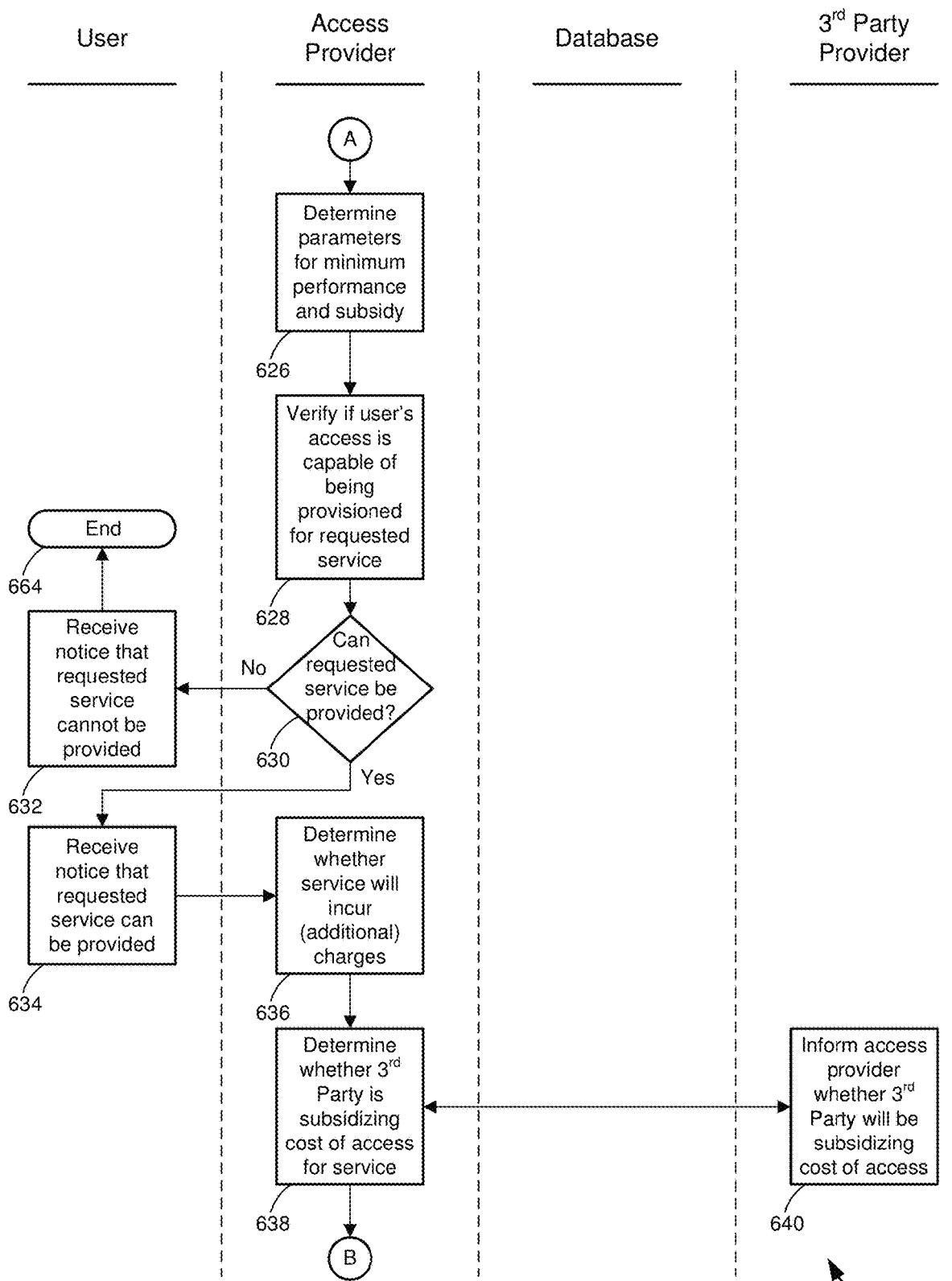
Figure 6C:
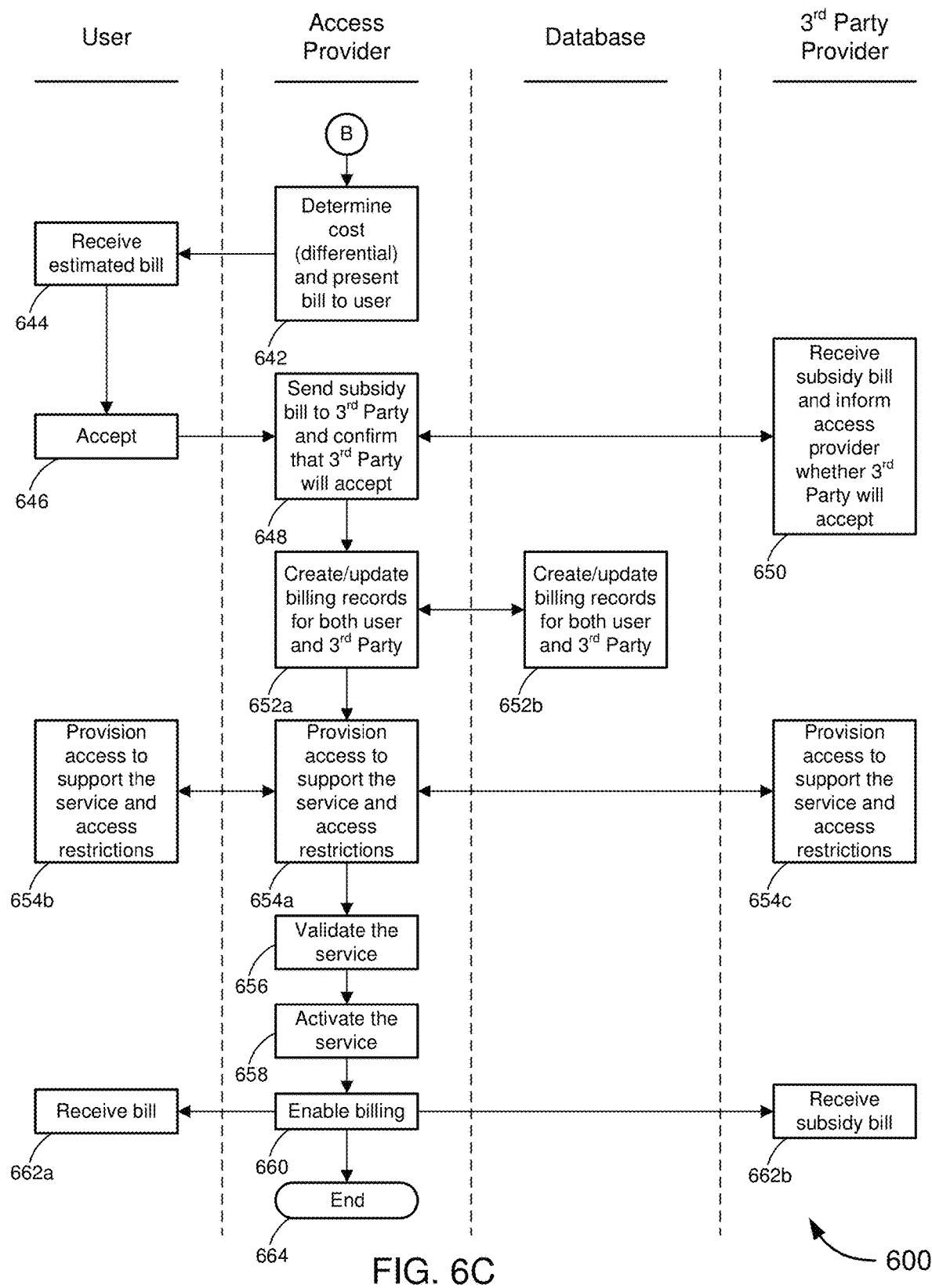
Figure 7A:
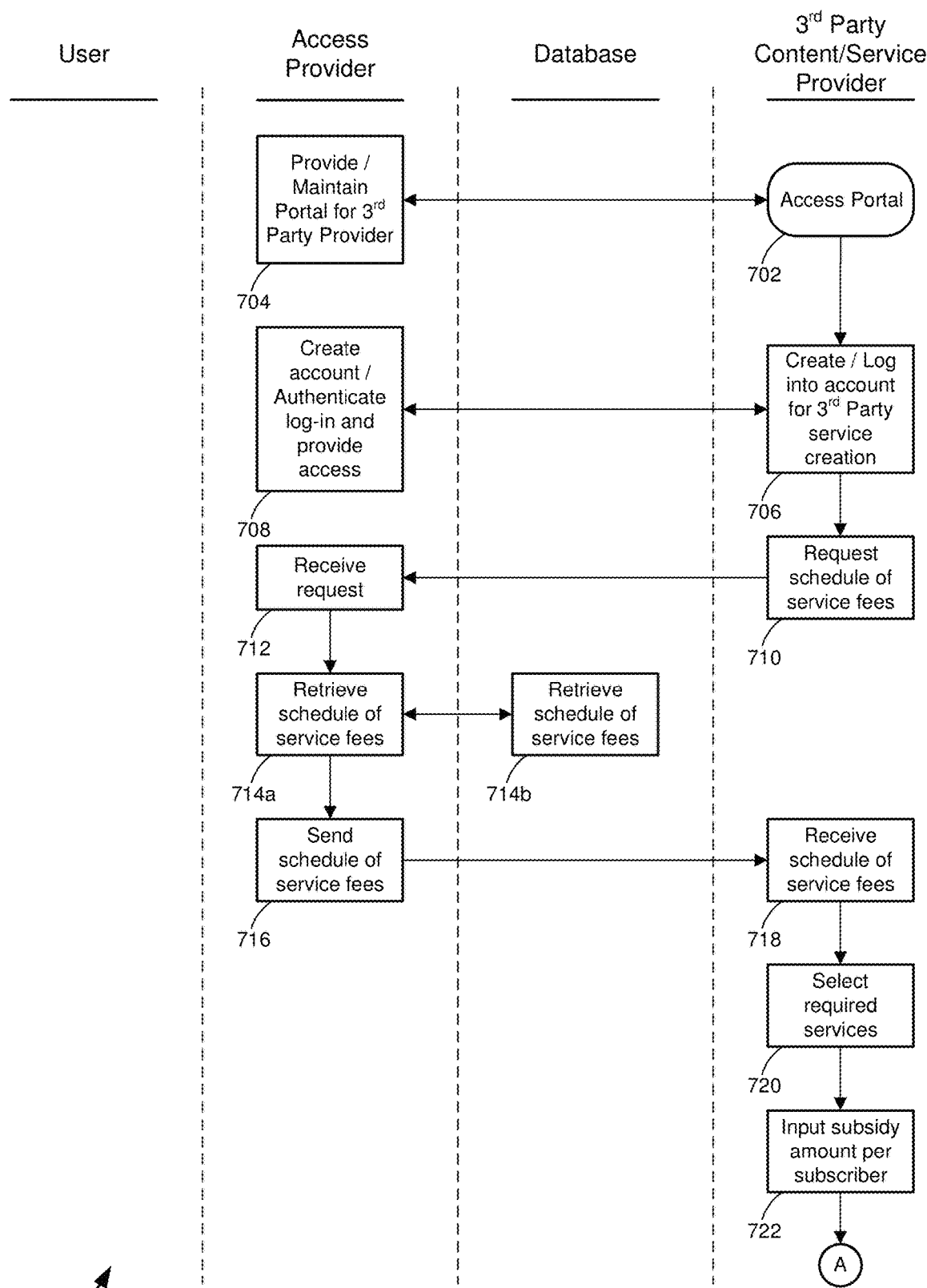
FIG. 7A-7C represent a system flow diagram illustrating a method for enabling a $3^{rd}$ party content provider to create a service through an access provider portal, in accordance with various embodiments.
Figure 7B:
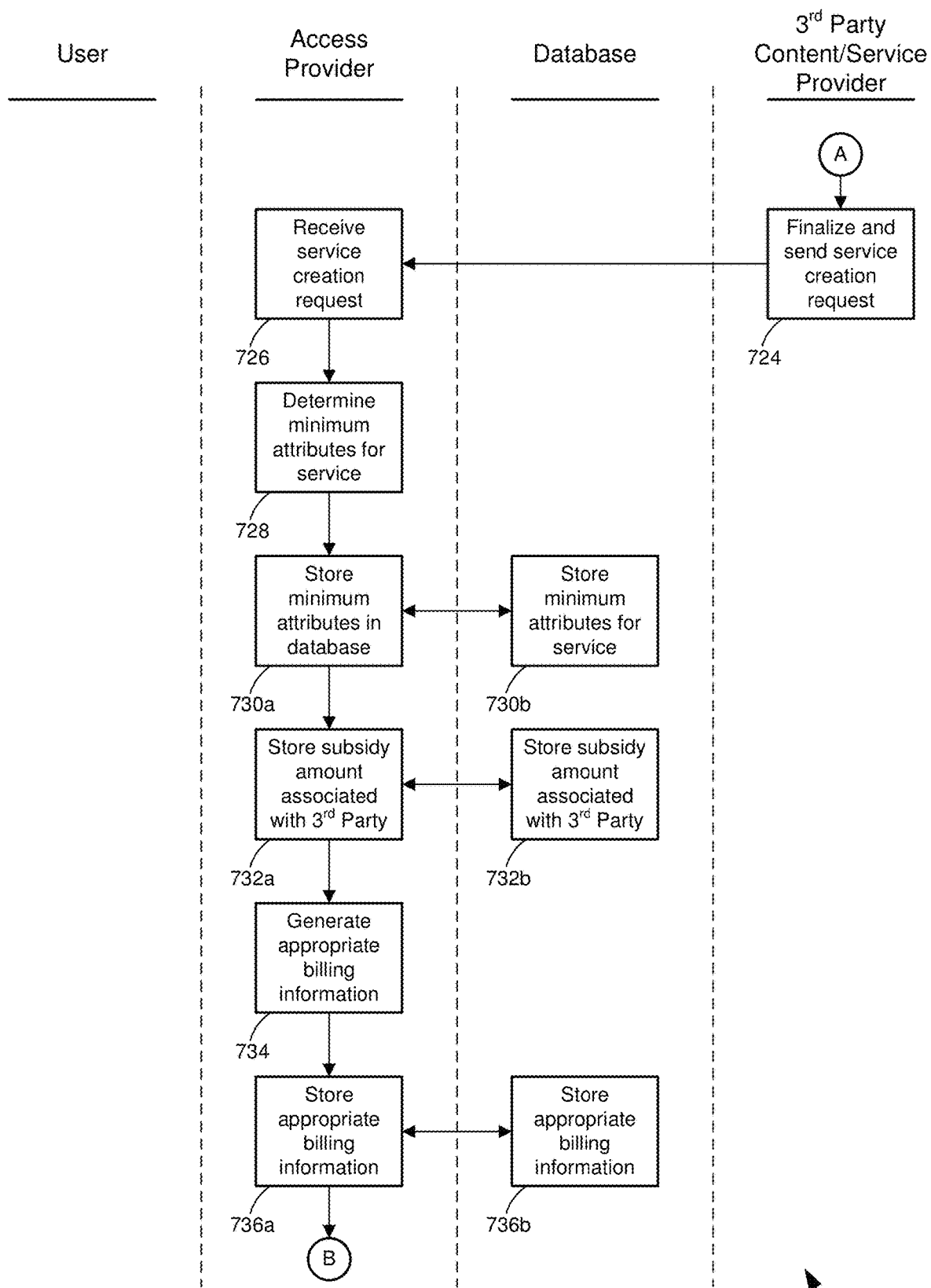
Figure 7C:
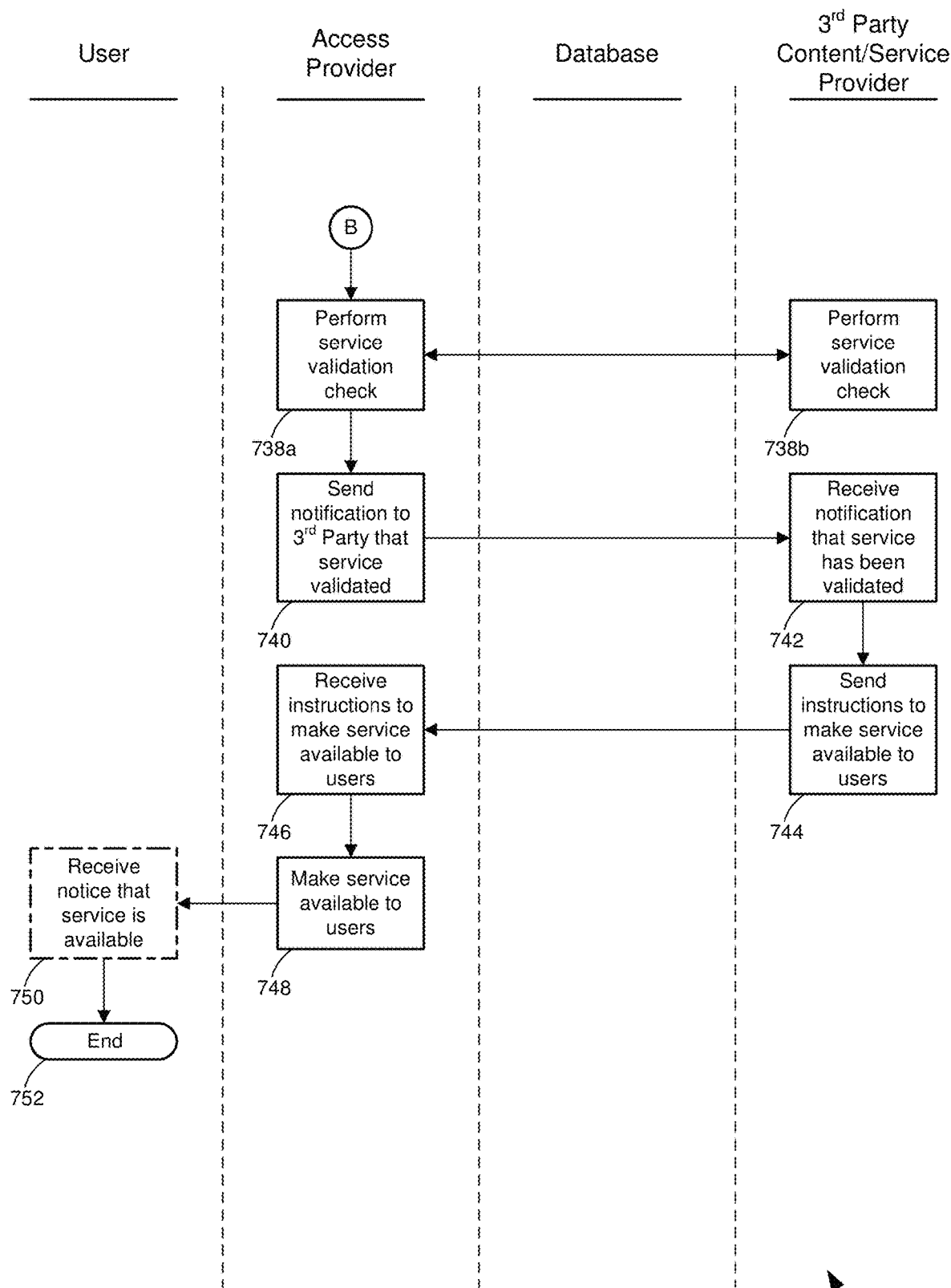
Figure 8A:
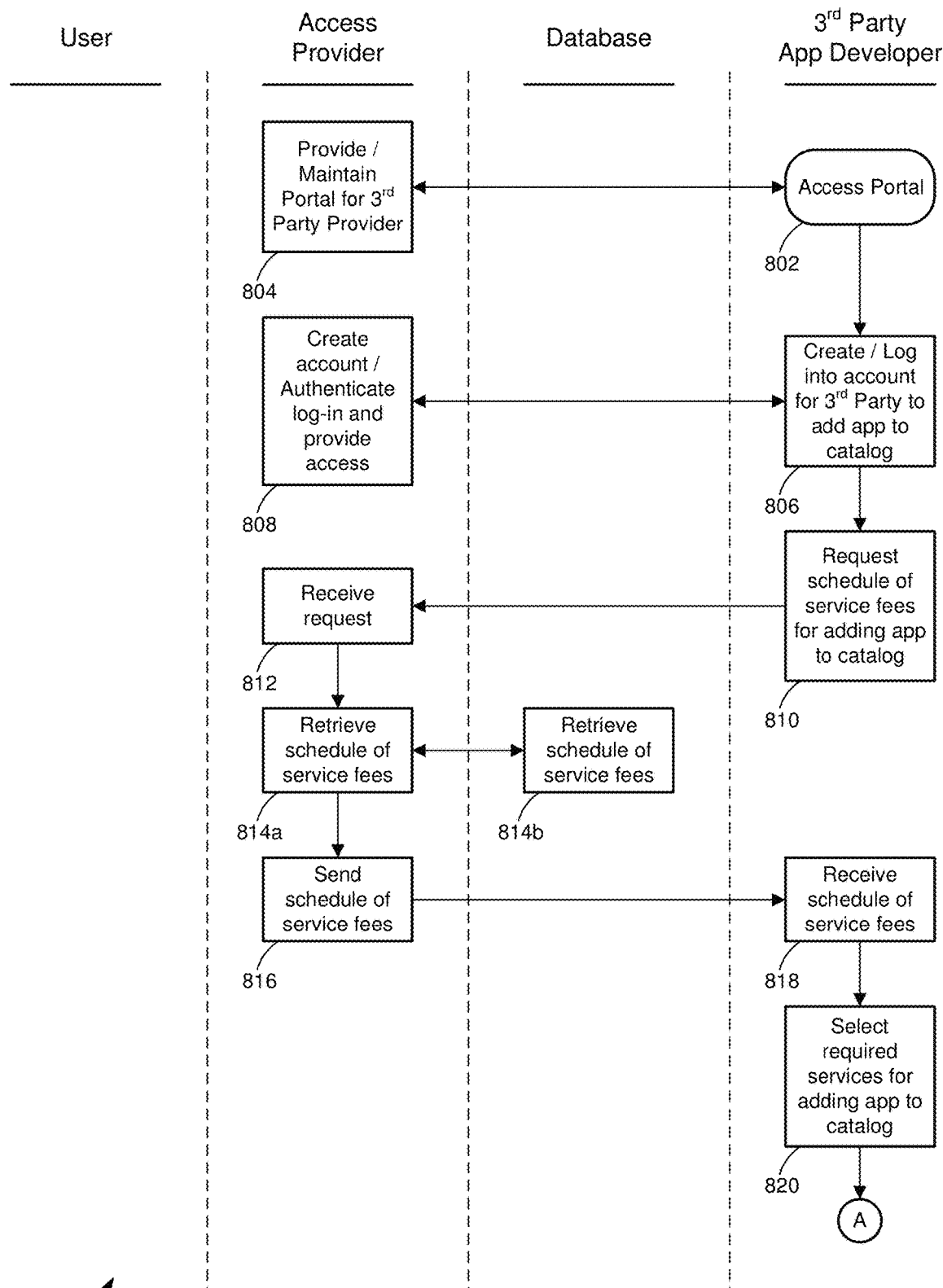
FIG. 8A-8C represent a system flow diagram illustrating a method for enabling a $3^{rd}$ party content provider to add a new application to a catalog of content and/or services, in accordance with various embodiments.
Figure 8B:
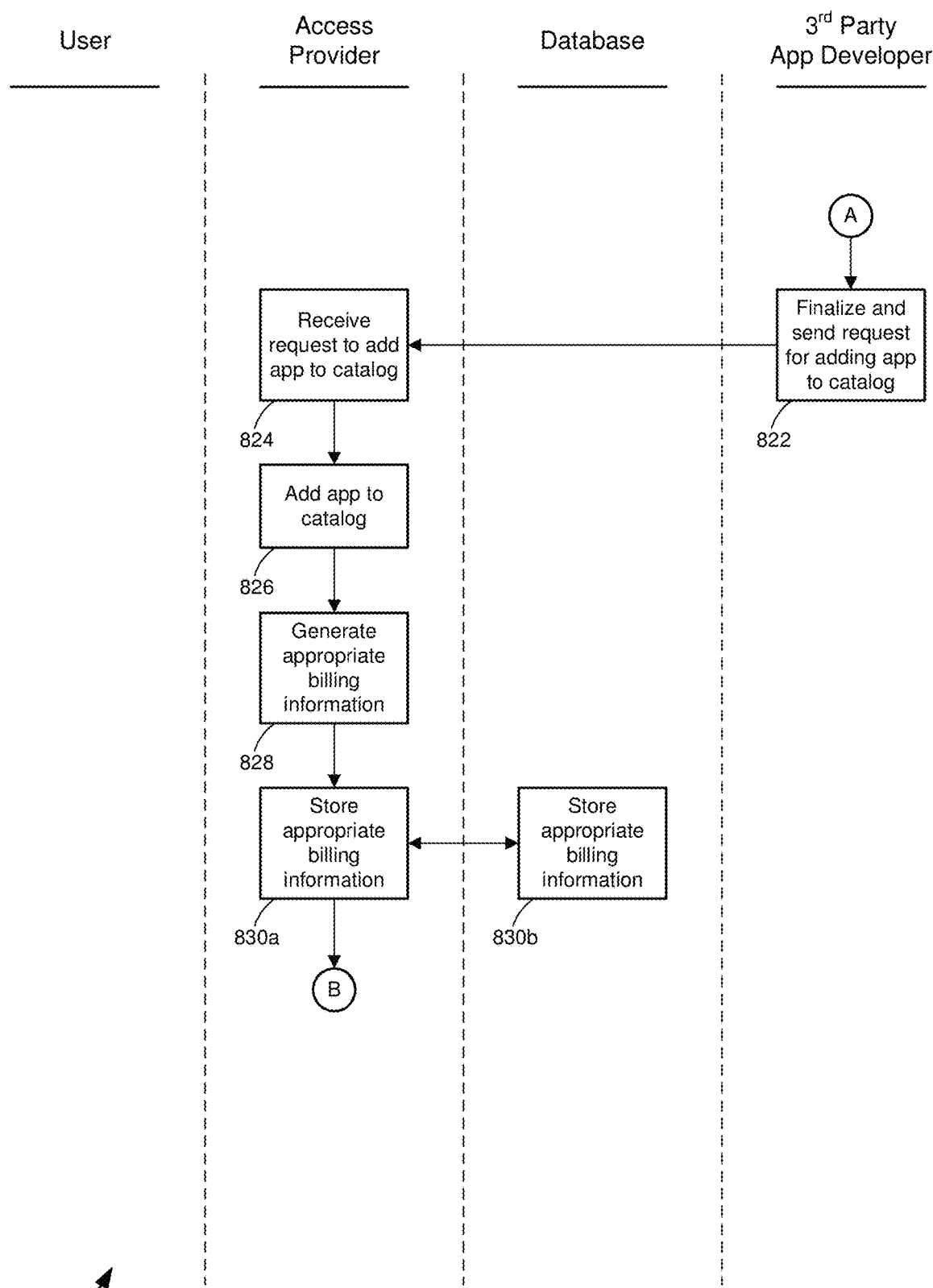
Figure 8C:
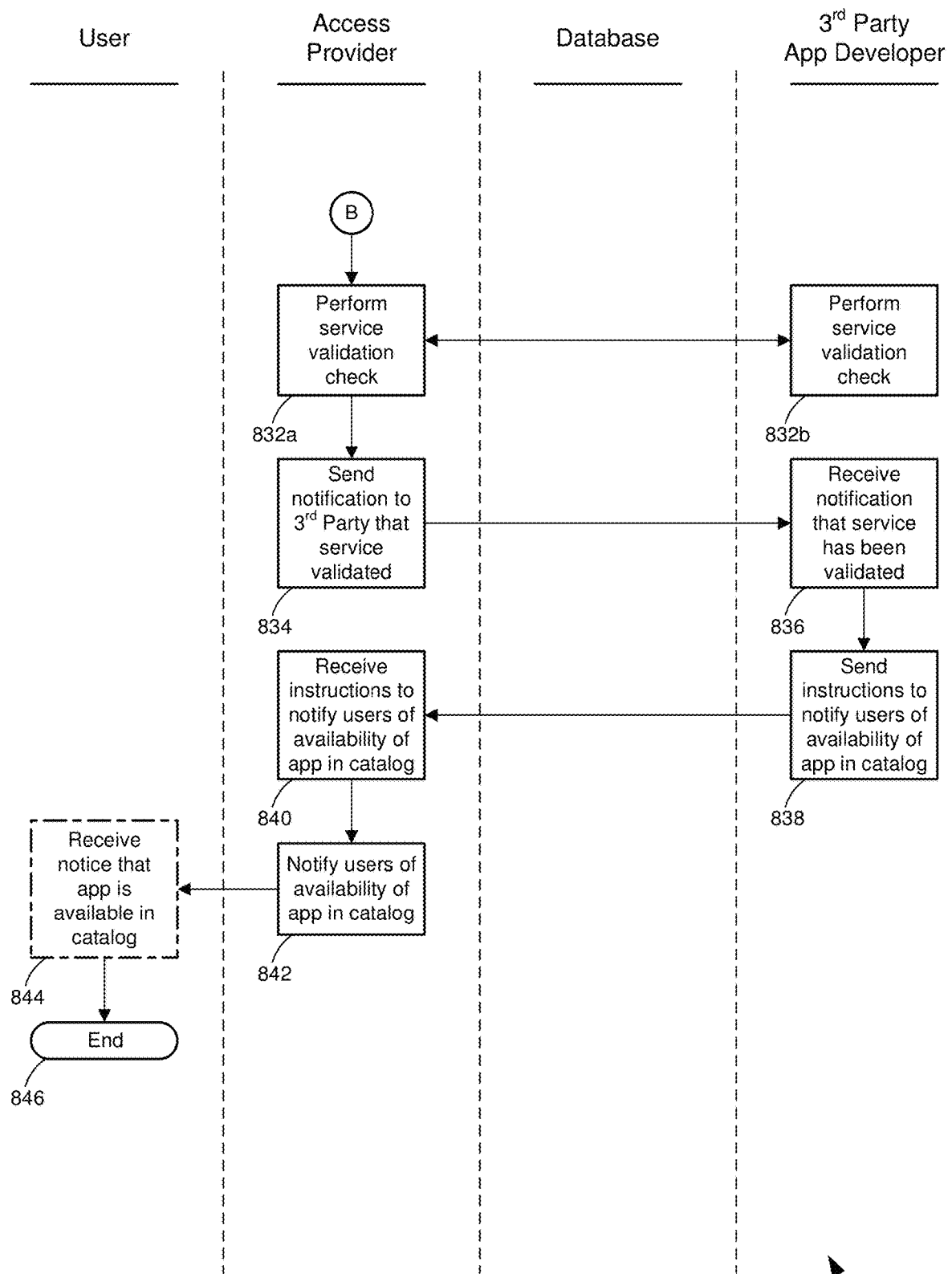

We now turn to FIGS. 6A-8C, which depict various system flow diagram illustrating a method for implementing application and/or content access control, based at least in part on a consumer's choice of applications, content, and/or content providers (FIGS. 6A-6C), a method for enabling a $3^{rd}$ party content provider to create a service through an access provider portal (FIGS. 7A-7C), and a method for enabling a $3^{rd}$ party content provider to add a new application to a catalog of content and/or services (FIGS. 8A-8C).

Herein, "user" might refer to a user, a consumer, or a subscriber, and/or might refer to a user device or other device (in some cases, via a web browser, an application ("app"), or the like) that is associated with the user. Likewise, "access provider" might refer to an access provider (including, without limitation, an Internet service provider, a telecommunications company, a mobile communications company, or the like) or a computing system associated with the access provider (including, but not limited to, a server(s) (e.g., user interface server(s) 115, access control server(s) 155, and/or profile server(s) 160 of FIG. 1, or the like), a gateway (e.g., BRG 410 or vG 420 of FIGS. 4 and 5, or the like), or some other computing system (e.g., server computing systems, cloud computing systems, or the like). Similarly, "$3^{rd}$ party content or service provider" (herein, simply referred to as "$3^{rd}$ party provider," "$3^{rd}$ party," "third party provider," or "third party") might refer to a content or service provider that provides content and/or services and/or a computing system associated with the $3^{rd}$ party provider. In some cases, the content might include, without limitation, at least one of applications (or software applications or "apps"), video content, audio content, image content, game content, website content, Internet search result content, and/or the like. In some instances, the services might include, but are not limited to, at least one of application services, media content services, on-line services, or tangible services associated with one or more of application services, media content services, on-line services, and/or the like.

FIG. 6A-6C (collectively, "FIG. 6") represent a system flow diagram illustrating a method 600 for implementing application and/or content access control, based at least in part on a consumer's choice of applications, content, and/or content providers, in accordance with various embodiments. The embodiments as represented in FIG. 6 are merely illustrative and are not intended to limit the scope of the various embodiments. With reference to FIG. 6, method 600 in FIG. 6A continues onto FIG. 6B, linked by circular markers denoted by "A," and continues from FIG. 6B to FIG. 6C, linked by circular marker denoted by "B."

Turning to FIG. 6A, method 600 might comprise, at block 602, a user clicking on a link provided by a $3^{rd}$ party provider, using the user's user device or any other device (in some cases, via a web browser, an application ("app"), or the like). At block 604, the link provided by the $3^{rd}$ party provider might direct the user to a portal provided by an access provider. Also at block 604, the $3^{rd}$ party provider might provide information identifying the $3^{rd}$ party and the application(s), content(s), and/or service(s) associated with the link selected by the user (for the purposes of FIG. 6, application(s), content(s), and/or service(s) associated with the link selected by the user might be referred to simply as "service(s)"). In some cases, the link itself might provide the identification of the $3^{rd}$ party and/or the service(s). At block 606, the access provider might receive the information identifying the $3^{rd}$ party and/or the service(s). In the case that the link itself provides such identification, the receiving step at block 606 might include the link directing the user to a specific website, webpage, portal, or other location that is associated with one or both of the $3^{rd}$ party and/or the service(s).

Method 600 might further comprise the access provider requesting the user's access provider credentials (e.g., log-in and password associated with the user through the access provider's systems) (block 608), which request might be received by the user at block 610. At block 612, the user might input and send the user's credentials to the access provider, which might authenticate the user (block 614), by comparing with the user credentials associated with the user that are stored in a database (e.g., database 130 or 165, or the like) (block 616). If the user is not successfully authenticated, the access provider might notify the user (not shown) and might repeat the processes at blocks 608 through 616 for a predetermined number of attempts (e.g., 5 attempts, or the like). If the attempts by the user exceed the predetermined number of attempts, the access provider might lock the user out of his or her account for a predetermined period (e.g., an hour, a few hours, a 24 hour period, a 48 hour period, or the like). Such authentication techniques are known to those skilled in the art, and are omitted here for simplicity. Once the user has been authenticated, the access provider might, at block 618, provide an option to the user to subscribe to the $3^{rd}$ party provider's service(s) (which are associated with the link that the user followed). The user, at block 620, might receive such option to subscribe, and might send input to the access provider to subscribe to the service(s) (block 622). At block 624, the access provider might receive the user input to subscribe to the $3^{rd}$ party provider's service(s). The process subsequently continues to block 626 in FIG. 6B, linked by circular marker denoted by "A."

At block 626, the access provider might determine parameters for minimum performance of the service(s) through the access provider's network or computing systems, and might also determine parameters for enabling the $3^{rd}$ party provider to offer subsidies to the user. The access provider, at block 628, might verify if the user's access is capable of being provisioned for the requested service(s). If it is determined at block 630 that the requested service cannot be provided, then the access provider might inform the user (via a notice) that the requested service cannot be provided, and the user might receive such a notice at block 632, and the process might end. On the other hand, if it is determined at block 630 that the requested service can be provided, then the access provider might inform the user (via another notice) that the requested service can be provided, and the user might receive such other notice at block 634. At block 636, the access provider might determine whether the service(s) will incur charges or additional charges. If not, the process might skip to block 654 (linking step not shown). Here, it is assumed that charges or additional charges will be incurred for accessing the service(s), and the process continues to block 638. At block 638, the access provider might determine whether the $3^{rd}$ party provider is subsidizing cost of access to at least the service(s), and the $3^{rd}$ party provider might, at block 640, inform the access provider whether it will be subsidizing at least the cost of access to the service(s). The process subsequently continues to block 642 in FIG. 6C, linked by circular marker denoted by "B."

At block 642, the access provider might determine the cost (or cost differential) and might present the user with an estimated bill, which might be received by the user at block 644. Assuming that the user accepts (at block 646), the access provider might send a subsidy bill to the $3^{rd}$ party provider and might confirm whether the $3^{rd}$ party provider will accept the subsidy bill (block 648). At block 650, the $3^{rd}$ party provider might receive the subsidy bill and might inform the access provider whether it will accept the subsidy bill. For the purposes of FIG. 6, it is assumed that the $3^{rd}$ party provider accepts. At block 652a, the access provider might create or update billing records for both the user and the $3^{rd}$ party provider, which might be reflected in the billing records for both the user and the $3^{rd}$ party provider in the database (block 652b).

At block 654, the method might comprise provisioning access to support the service(s) and to support access restrictions for certain other service(s) (e.g., services provided by competitors of the $3^{rd}$ party provider, or the like). Specifically, such provisioning might be performed at network or computing system components (block 654a), at the user's user devices or other devices (block 654b), and/or at the $3^{rd}$ party provider's network or computing system components (block 654c). At block 656, the access provider might validate the service(s) and might activate the service(s) at block 658. At block 660, the access provider might enable billing, and the user might receive the bill at block 662a, while the $3^{rd}$ party provider might receive the subsidy bill at block 662b. If the $3^{rd}$ party is providing a full subsidy for the user's network access (e.g., Internet access), including accessing to the service(s), then the user's bill might reflect a balance that will be paid by the $3^{rd}$ party provider (with a zero balance on the part of the user). If the $3^{rd}$ party is providing a partial subsidy either for the user's network access (e.g., Internet access) and/or for the user's access to the service(s) (specifically), then the $3^{rd}$ party provider's bill might reflect the partial subsidy amount, while the user's bill might reflect the difference between the total amount and the subsidy amount, with a notice indicating that the $3^{rd}$ party provider will be responsible for the subsidy amount. The process might subsequently end at block 664.

FIG. 7A-7C (collectively, "FIG. 7") represent a system flow diagram illustrating a method 700 for enabling a $3^{rd}$ party content provider to create a service through an access provider portal, in accordance with various embodiments. The embodiments as represented in FIG. 7 are merely illustrative and are not intended to limit the scope of the various embodiments. With reference to FIG. 7, method 700 in FIG. 7A continues onto FIG. 7B, linked by circular markers denoted by "A," and continues from FIG. 7B to FIG. 7C, linked by circular marker denoted by "B."

With reference to FIG. 7A, method 700 might comprise a third party provider accessing a portal provided by an access provider (block 702). At block 704, the access provider might provide or maintain the portal for the $3^{rd}$ party provider. The $3^{rd}$ party provider might, at block 706, create or log into an account for the $3^{rd}$ party provider to create a service(s). Herein, "creating a service" or "service creation" might refer to creating a link, creating access provider connections, or creating delivery methods/channels for providing the service(s) to a user. At block 708, the access provider might create an account or authenticate the log-in, and might provide access to the $3^{rd}$ party provider to create a service(s) through the access provider's network or computing systems.

At block 710, the $3^{rd}$ party provider might request a schedule of service fees for creating and providing users access to the service(s). The access provider might receive the request (block 712), might retrieve the schedule of service fees (block 714a) (in some cases, by accessing and retrieving the schedule of service fees from a database (block 714b)), and might send the schedule of service fees to the $3^{rd}$ party provider (block 716). The third party provider might receive the schedule of service fees (block 718), might select the required services (block 720), and might input a subsidy amount that the $3^{rd}$ party is willing to pay per subscriber in general (or might input a subsidy amount that the $3^{rd}$ party is willing to pay for certain types of subscribers (e.g., subscribers falling under certain demographic groups, subscribers who has previously or is currently a customer of the $3^{rd}$ party, or subscribers that the $3^{rd}$ party would like to have as customers, or the like). In some cases, the $3^{rd}$ party provider might input a blanket subsidy amount for all subscribers, a blanket subsidy amount for each class of subscribers, an algorithm for calculating subsidy amounts for each class of subscriber, or an algorithm for calculating subsidy amounts for individual subscribers (on a per subscriber basis), or an option to ask the 3$^{rd}$ party provider regarding subsidy amounts for each individual subscriber (on a per subscriber basis), or the like. The process subsequently continues to block 724 in FIG. 7B, linked by circular marker denoted by "A."

At block 724, the 3$^{rd}$ party provider might finalize and send the service(s) creation request to the access provider, which might receive the service(s) creation request at block 726. At block 728, the access provider might determine the minimum attributes for providing the service(s) to the user, and might store the minimum attributes (block 730a), in some cases, in a database (block 730b). At block 732a, the access provider might store the subsidy amount (or algorithm) associated with a 3$^{rd}$ party, in some instances, storing in a database (block 732b). The access provider might, at block 734 generate appropriate billing information, and might store such information (block 736a), in some cases, in a database (block 736b). The process subsequently continues to block 738a in FIG. 7C, linked by circular marker denoted by "B."

The access provider might perform a service validation check, which might be performed on the network or computing system components associated with the access provider (block 738a), and/or might be performed on the network or computing system components associated with the 3$^{rd}$ party provider (block 738b). Assuming that the validation check is successful, at block 740, the access provider might send a notification to the third party provider indicating that the service has been validated. At block 742, the 3$^{rd}$ party provider might receive such notification, and might send instructions to the access provider to make the service(s) available to users (block 744), which instructions might be received by the access provider at block 746. At block 748, the access provider might make the service(s) available to the users. In some embodiments, the method 700 might further comprise sending a notice to the user indicating that the service(s) is available, who might receive the notice at (optional) block 750. In some cases, the notice might include an e-mail notice, a postcard notice, a letter notice, a text message notice, a chat message notice, and/or the like. Each notice, in some instances, might include a link to the service(s), and following the link might follow the processes described above with respect to blocks 602 through 664 of FIG. 6. The process might subsequently end at block 752.

FIG. 8A-8C (collectively, "FIG. 8") represent a system flow diagram illustrating a method 800 for enabling a 3$^{rd}$ party content provider to add a new application to a catalog of content and/or services, in accordance with various embodiments. The embodiments as represented in FIG. 8 are merely illustrative and are not intended to limit the scope of the various embodiments. With reference to FIG. 8, method 800 in FIG. 8A continues onto FIG. 8B, linked by circular markers denoted by "A," and continues from FIG. 8B to FIG. 8C, linked by circular marker denoted by "B."

Turning to FIG. 8A, method 800 might comprise a third party provider accessing a portal provided by an access provider (block 802). At block 804, the access provider might provide or maintain the portal for the 3$^{rd}$ party provider. The 3$^{rd}$ party provider might, at block 806, create or log into an account for the 3$^{rd}$ party provider to add service(s) (including apps and/or content) to a catalog, not unlike the process of service(s) creation as described above with respect to FIG. 7. At block 808, the access provider might create an account or authenticate the log-in, and might provide access to the 3$^{rd}$ party provider to add an application or content to a catalog that is disseminated through the access provider's network or computing systems.

At block 810, the 3$^{rd}$ party provider might request a schedule of service fees for adding an application or content to the catalog. The access provider might receive the request (block 812), might retrieve the schedule of service fees (block 814a) (in some cases, by accessing and retrieving the schedule of service fees from a database (block 814b)), and might send the schedule of service fees to the 3$^{rd}$ party provider (block 816). The third party provider might receive the schedule of service fees (block 818), might select the required services for adding an application or content to the catalog (block 820). The process subsequently continues to block 822 in FIG. 8B, linked by circular marker denoted by "A."

At block 822, the 3$^{rd}$ party provider might finalize and send a request to the access provider to add an application or content to the catalog. The access provider might receive the service(s) creation request at block 824. At block 826, the access provider might add the application or content to the catalog. The access provider might, at block 828 generate appropriate billing information, and might store such information (block 830a), in some cases, in a database (block 830b). The process subsequently continues to block 832a in FIG. 8C, linked by circular marker denoted by "B."

The access provider might perform a service validation check, which might be performed on the network or computing system components associated with the access provider (block 832a), and/or might be performed on the network or computing system components associated with the 3$^{rd}$ party provider (block 832b). Assuming that the validation check is successful, at block 834, the access provider might send a notification to the third party provider indicating that the service has been validated. At block 836, the 3$^{rd}$ party provider might receive such notification, and might send instructions to the access provider to notify users of the availability of the applications and/or content in the catalog (block 838), which instructions might be received by the access provider at block 840. At block 842, the access provider might notify users regarding the availability of the applications and/or content in the catalog. In some embodiments, the method 800 might further comprise sending a notice to the user indicating that the applications and/or content are available in the catalog, and the users might receive the notice at (optional) block 844. In some cases, the notice might include an e-mail notice, a postcard notice, a letter notice, a text message notice, a chat message notice, and/or the like. Each notice, in some instances, might include a link to the service(s), and following the link might follow the processes described above with respect to blocks 602 through 664 of FIG. 6. The process might subsequently end at block 846.

Figure 9:
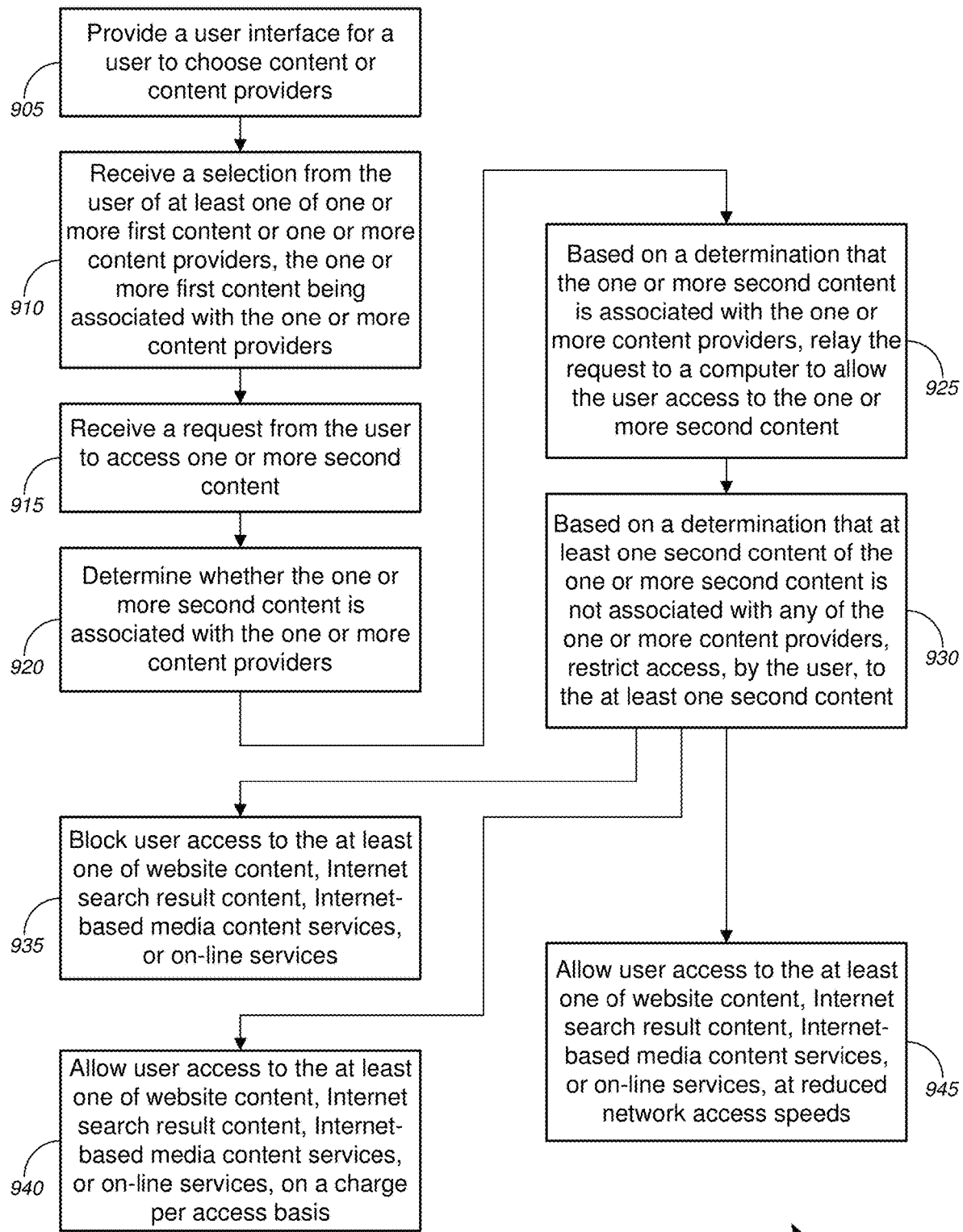
FIG. 9 is a flow diagram illustrating a method for implementing application and/or content access control, based at least in part on a consumer's choice of applications, content, and/or content providers, in accordance with various embodiments.

FIG. 9 is a flow diagram illustrating a method 900 for implementing application and/or content access control, based at least in part on a consumer's choice of applications, content, and/or content providers, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by or with (and, in some cases, are described below with respect to) the systems 100-500 of FIGS. 1-5, respectively (or components thereof), such methods may also be implemented using any suitable hardware implementation. Similarly, while each of the systems 100-500 (and/or components thereof) of FIGS. 1-5, respectively, can operate according to the method illustrated by FIG. 9 (e.g., by executing instructions embodied on a computer readable medium), the systems 100-500 can each also operate according to other modes of operation and/or perform other suitable procedures.

In the embodiment of FIG. 9, method 900 might comprise, at block 905, providing a user interface for a user to choose content or content providers. In some cases, a first computer might provide the user interface. At block 910, method 900 might comprise receiving a selection from the user of at least one of one or more first content or one or more content providers, the one or more first content being associated with the one or more content providers. In some instances, a second computer might receive the selection from the user over a network via the first computer and via the user interface. Method 900 might further comprise receiving a request from the user to access one or more second content (block 915) and determining whether the one or more second content is associated with the one or more content providers (block 920). According to some embodiments, the second computer might receive the request and might determine whether the one or more second content is associated with the one or more content providers.

In general, the one or more first content and the one or more second content each might comprise at least one of applications, video content, audio content, image content, game content, website content, Internet search result content, application services, media content services, on-line services, or tangible services associated with one or more of application services, media content services, and/or on-line services, or the like. Merely by way of example, the first computer might comprise a user device selected from a group consisting of a tablet computer, a smart phone, a mobile phone, a portable gaming device, a laptop computer, a desktop computer, a gaming console, a television, a digital video recorder, a set-top box, a media content presentation device, and a mobile user device interface apparatus. In some cases, the user interface might comprise a web portal. In some instances, the user interface might be an app interface, a graphical user interface, and/or the like, that might be interfaces either for locally running applications/software programs or for web-based, network-based, or cloud-based applications/software programs, or both (simultaneously or concurrently).

At block 925, method 900 might comprise, based on a determination that the one or more second content is associated with the one or more content providers, relaying the request to another computer (e.g., a third computer) to allow the user access to the one or more second content. According to some embodiments, the second computer and the third computer are the same computer. In some cases, at least one of the second computer or the third computer is a server computer associated with an access provider.

Method 900 might further comprise, based on a determination that at least one second content of the one or more second content is not associated with any of the one or more content providers, restricting access, by the user, to the at least one second content. Restricting access to the at least one second content might comprise one of blocking user access to the at least one second content, allowing user access to the at least one second content on a charge per access basis, or allowing user access to the at least one second content at reduced network access speeds. In non-limiting embodiments in which the at least one second content comprises at least one of website content, Internet search result content, Internet-based media content services, or on-line services, restricting access to the at least one second content might comprise one of blocking user access to the at least one of website content, Internet search result content, Internet-based media content services, or on-line services (block 935), allowing user access to the at least one of website content, Internet search result content, Internet-based media content services, or on-line services, on a charge per access basis (block 940), or allowing user access to the at least one of website content, Internet search result content, Internet-based media content services, or on-line services, at reduced network access speeds (block 945).

In some embodiments, the access provider might be an Internet service provider, and, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider, in accordance with the non-limiting examples described above with respect to blocks 930-945.

According to some examples, one party (such as the access provider, which may or may not be an Internet service provider) might control both the user access device (e.g., an STB, an gateway (e.g., BRG, vG, and the like), or the like) and the access servers (e.g., access control server 155, or the like) that implement access controls to content (i.e., media content, services, apps, or the like, as described above). In alternative embodiments, an access control server (e.g., access control server 155, or the like)—which might be independent of any user device that receives the user selection/choice of content or content providers—might provide or restrict access to content, based on whether the user has entered into a content access agreement with a content provider(s), either by looking at the user's user profile(s), by looking at the user's selection history, by looking at available content access agreements associated with the user, or by utilizing access control lists, and/or the like. These techniques, among others, are described below with respect to FIGS. 10A-10D.

FIGS. 10A-10D (collectively, "FIG. 10") are flow diagrams illustrating various methods 1000 for implementing application and/or content access control, based at least in part on a consumer's choice of applications, content, and/or content providers, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by or with (and, in some cases, are described below with respect to) the systems 100-500 of FIGS. 1-5, respectively (or components thereof), such methods may also be implemented using any suitable hardware implementation. Similarly, while each of the systems 100-500 (and/or components thereof) of FIGS. 1-5, respectively, can operate according to the method illustrated by FIG. 10 (e.g., by executing instructions embodied on a computer readable medium), the systems 100-500 can each also operate according to other modes of operation and/or perform other suitable procedures.

Figure 10A:
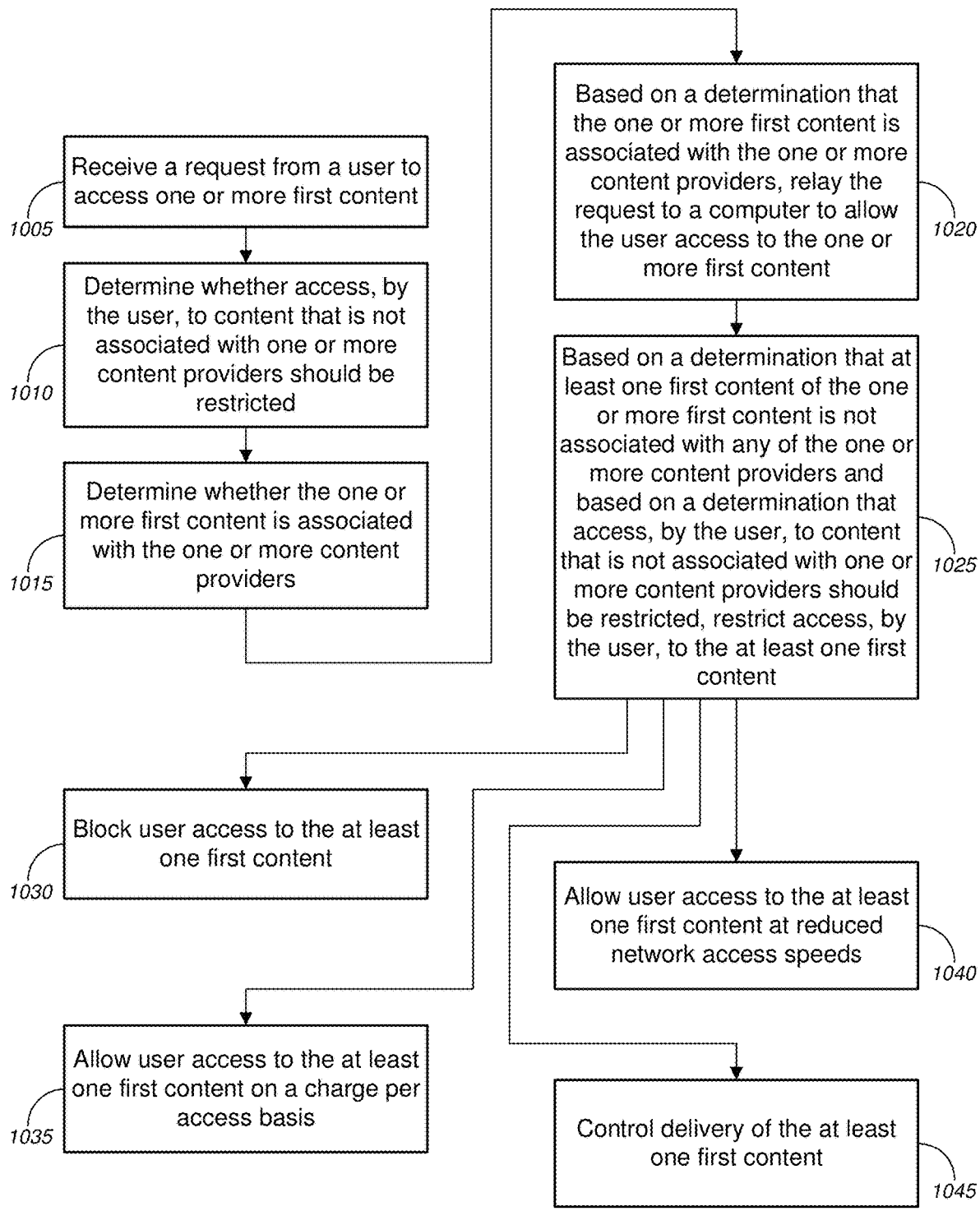
FIGS. 10A-10D are flow diagrams illustrating various methods for implementing application and/or content access control, based at least in part on a consumer's choice of applications, content, and/or content providers, in accordance with various embodiments.

With reference to FIG. 10A, method 1000 might comprise receiving a request from a user to access one or more first content (block 1005), determining whether access, by the user, to content that is not associated with one or more content providers should be restricted (block 1010), and determining whether the one or more first content is associated with the one or more content providers (block 1015). In some cases, a first computer might perform at least some, if not all, of these processes. In some embodiments, the one or more first content each might comprise at least one of applications, video content, audio content, image content, game content, website content, Internet search result content, application services, media content services, on-line services, and/or tangible services associated with one or more of application services, media content services, and/or on-line services, or the like.

At block 1020, method 1000 might comprise, based on a determination that the one or more first content is associated with the one or more content providers, relaying the request to a second computer to allow the user access to the one or more first content. At block 1025, method 1000 might comprise, based on a determination that at least one first content of the one or more first content is not associated with any of the one or more content providers and based on a determination that access, by the user, to content that is not associated with one or more content providers should be restricted, restricting access, by the user, to the at least one first content.

According to some embodiments, restricting access to the at least one first content might comprise at least one of blocking user access to the at least one first content (block 1030), allowing user access to the at least one first content on a charge per access basis (block 1035), allowing user access to the at least one first content at reduced network access speeds (block 1040), and/or controlling delivery of the at least one first content (block 1045). In some cases, controlling delivery of the at least one first content might comprise at least one of implementing application aware network management on per subscriber basis, implementing software defined networking ("SDN"), implementing deep packet inspection ("DPI"), implementing network functions virtualization ("NFV") with management and orchestration functions, implementing at least one of service chaining graphs or service forwarding graphs, implementing a virtual and/or hardware-based "walled garden" software platform or system, and/or the like.

In some embodiments, the first computer might be a computer associated with an access provider, and the first computer might host a network functions virtualization infrastructure ("NFVI") platform, on which at least one of an application or a virtual network function ("VNF") that is associated with at least one content provider of the one or more content providers is run. In such embodiments, at least one of determining whether access, by the user, to content that is not associated with one or more content providers should be restricted, determining whether the one or more first content is associated with the one or more content providers, relaying the request to a second computer to allow the user access to the one or more first content, and restricting access, by the user, to the at least one first content might be performed by the at least one of the application or the VNF running on the NFVI platform hosted on the first computer. In some cases, the access provider (e.g., a service provider or Internet service provider) can allow an application/content/service provider (that was selected by the user for subsidy) to put its application/VNF on the access provider's NFVI platform, and the access control/restriction of applications, content, and/or services (per the user's agreement with the application/content/service provider) might be entirely or mostly the responsibility (and entirely or mostly in the control) of the application/content/service provider.

Figure 10B:
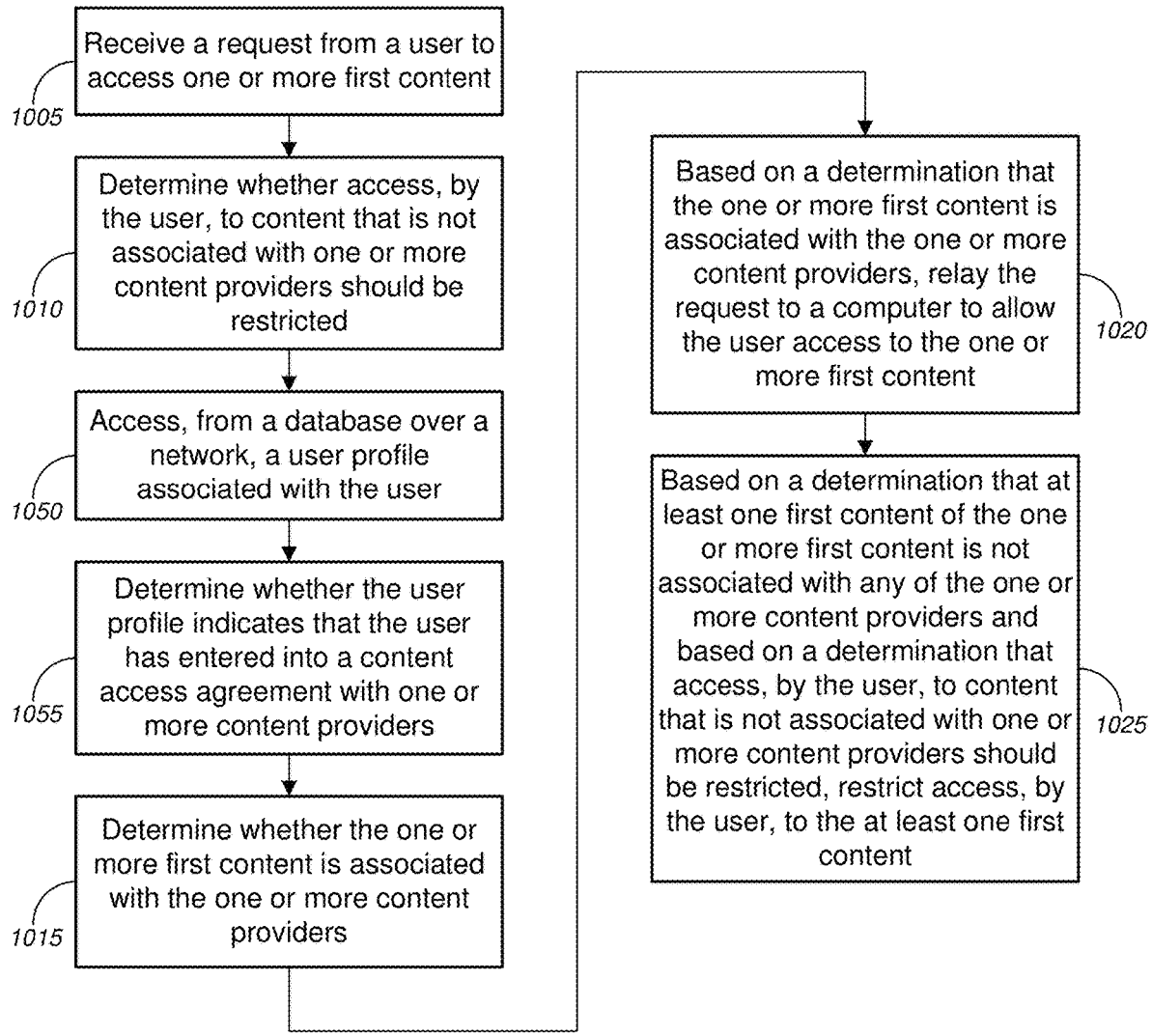

In FIG. 10B, blocks 1005-1025 are similar, if not identical, to blocks 1005-1025 of FIG. 10A, and thus the description of the processes at blocks 1005-1025 in FIG. 10A are applicable to those of blocks 1005-1025 in FIG. 10B, and are omitted here to avoid excessive duplication. Although not shown, blocks 1030-1045 of FIG. 10A may also be applicable to the method in FIG. 10B.

In the embodiment of FIG. 10B, determining whether access, by the user, to content that is not associated with one or more content providers should be restricted (at block 1010) might comprise accessing, from a database over a network, a user profile associated with the user (block 1050) and determining whether the user profile indicates that the user has entered into a content access agreement with one or more content providers (block 1055). In some instances, the accessing and determining processes of blocks 1050-1055 might be performed by the first computer.

In some cases, the processes of the method in FIG. 10B might be performed in a case in which there is an express agreement between the user and the content provider(s). According to some embodiments, at least one of the first computer or the second computer might be a server computer associated with an Internet service provider, and the content access agreement might provide that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

Figure 10C:
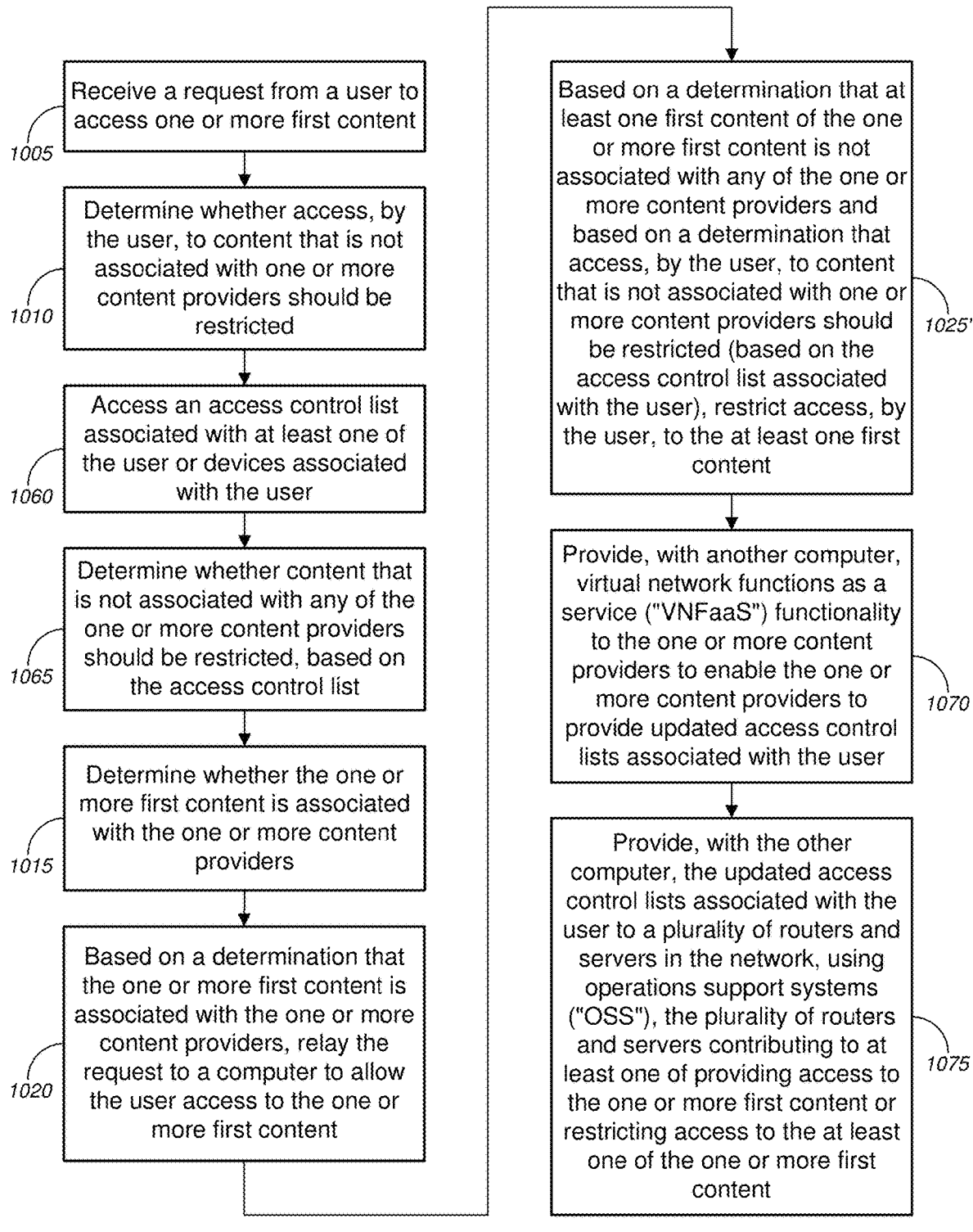

In FIG. 10C, blocks 1005-1025 are similar, if not identical, to blocks 1005-1020 of FIG. 10A, and thus the description of the processes at blocks 1005-1020 in FIG. 10A are applicable to those of blocks 1005-1020 in FIG. 10B, and are omitted here to avoid excessive duplication.

In the embodiment of FIG. 10C, determining whether access, by the user, to content that is not associated with one or more content providers should be restricted (at block 1010) might comprise accessing an access control list ("ACL") associated with at least one of the user or devices associated with the user (block 1060) and determining whether content that is not associated with any of the one or more content providers should be restricted, based at least in part on the ACL (block 1065). In some instances, the accessing and determining processes of blocks 1060-1065 might be performed by the first computer. In FIG. 10C, the process at block 1025' is similar to that of block 1025 of FIG. 10A, except that at block 1025', method 1000 comprises restricting access, by the user, to the at least one first content, based on a determination that at least one first content of the one or more first content is not associated with any of the one or more content providers and based on a determination that access, by the user, to content that is not associated with one or more content providers should be restricted (which is based on the ACL associated with the user and/or with devices associated with the user). Although not shown, blocks 1030-1045 of FIG. 10A may also be applicable to the method in FIG. 10C, except that such restrictions of access to the at least one first content are based at least in part on a determination that content that is not associated with any of the one or more content providers should be restricted, and such determination is based on the ACL associated with the user and/or with devices associated with the user.

In some embodiments, method 1000 might further comprise, at block 1070, providing, with another computer (e.g., a third computer), virtual network functions as a service ("VNFaaS") functionality to the one or more content providers to enable the one or more content providers to provide updated access control lists associated with at least one of the user or devices associated with the user. Alternatively, or in addition, method 1000 might further comprise providing (e.g., with the third computer) the updated access control lists associated with at least one of the user or devices associated with the user to a plurality of routers and servers in the network, using operations support systems ("OSS") (block 1075). The plurality of routers and servers might contribute to at least one of providing access to the one or more first content or restricting access to the at least one of the one or more first content.

Figure 10D:
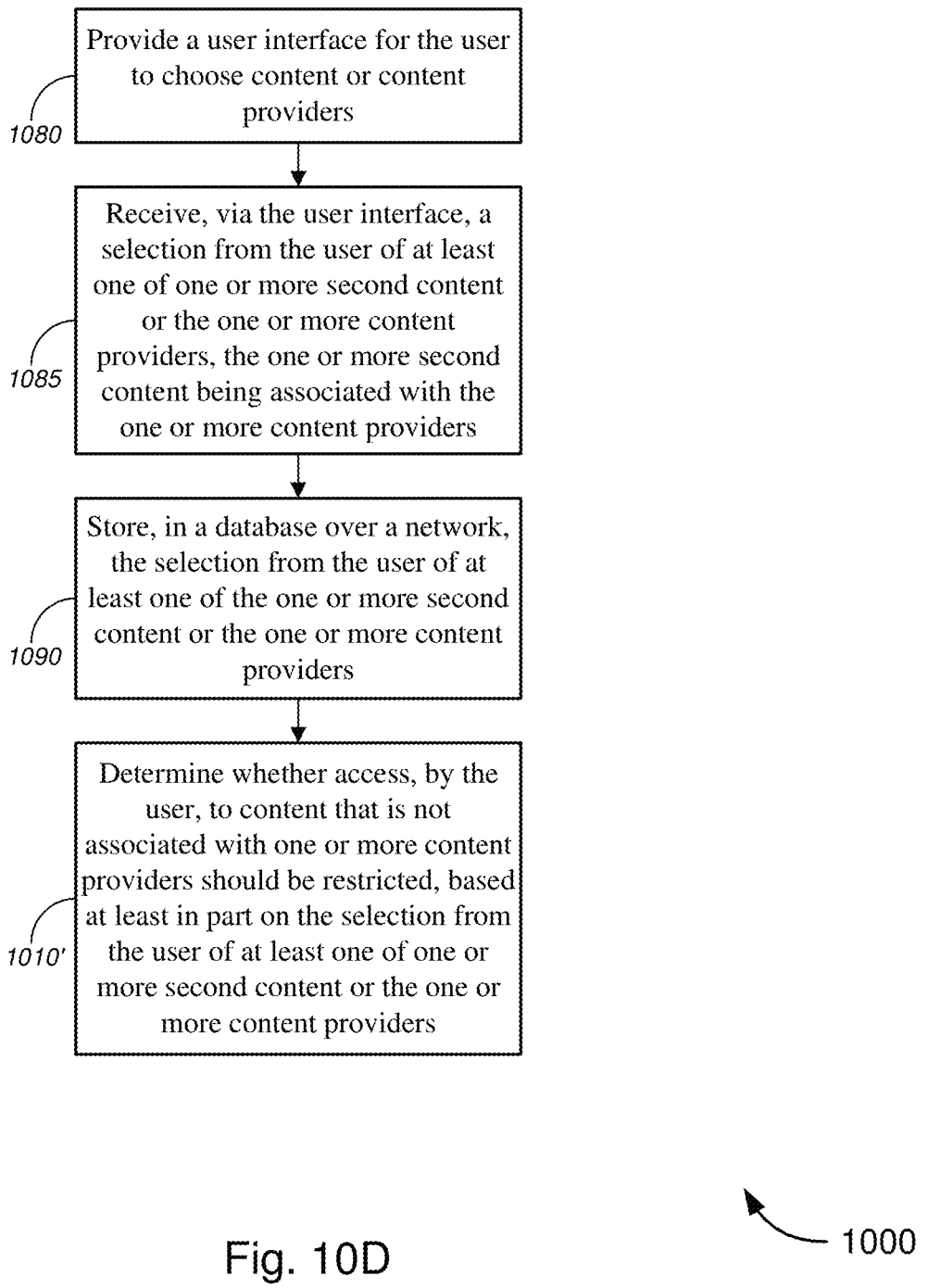

With reference to FIG. 10D, method 1000 might further comprise providing a user interface for the user to choose content or content providers (block 1080) and receiving, via the user interface, a selection from the user of at least one of one or more second content or the one or more content providers (block 1085). The one or more second content might be associated with the one or more content providers. Method 1000, at block 1090, might comprise storing, in a database over a network, the selection from the user of at least one of the one or more second content or the one or more content providers. In some cases, the processes of blocks 1080-1095 might be performed by a fourth computer. According to some embodiments, the process at block 1010' of FIG. 10D is similar to that of block 1010 of FIG. 10A, except that at block 1010', method 1000 comprises determining (with the first computer) whether access, by the user, to content that is not associated with one or more content providers should be restricted, based at least in part on the selection from the user of at least one of one or more second content or the one or more content providers.

The techniques of FIG. 10 are otherwise similar, if not identical to, the techniques as described above with respect to FIG. 9, and the descriptions of the embodiment of FIG. 9 may similarly applicable to those of the embodiment of FIG. 10 (unless incompatible, inconsistent, or otherwise stated as being different).

Figure 11:
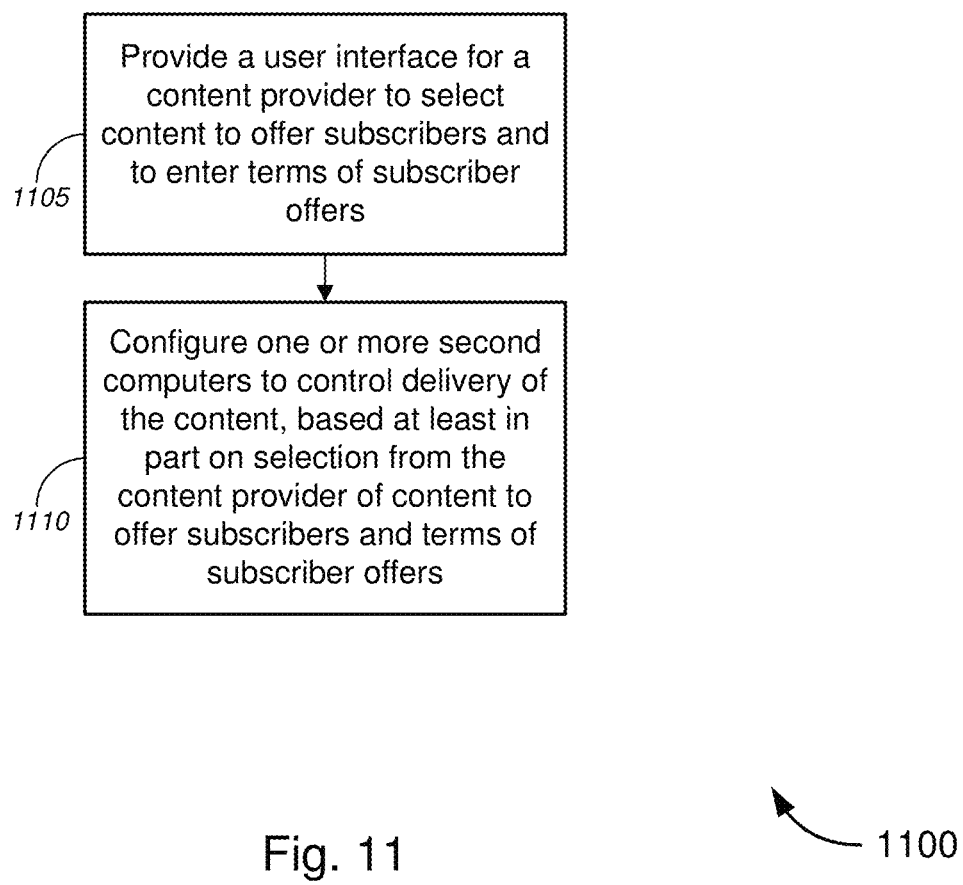
FIG. 11 is a flow diagram illustrating another method for implementing application and/or content access control, in accordance with various embodiments.

FIG. 11 is a flow diagram illustrating another method 1100 for implementing application and/or content access control, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 11 can be implemented by or with (and, in some cases, are described below with respect to) the systems 100-500 of FIGS. 1-5, respectively (or components thereof), such methods may also be implemented using any suitable hardware implementation. Similarly, while each of the systems 100-500 (and/or components thereof) of FIGS. 1-5, respectively, can operate according to the method illustrated by FIG. 11 (e.g., by executing instructions embodied on a computer readable medium), the systems 100-500 can each also operate according to other modes of operation and/or perform other suitable procedures.

In FIG. 11, method 1100 might comprise providing, with a first computer, a user interface for a content provider to select content to offer subscribers and to enter terms of subscriber offers (including, but not limited to, subsidies for restricted access to content associated with competitors, etc.) (block 1105). Method 1100 might further comprise, at block 1110, configuring, with the first computer, one or more second computers to control delivery of the content, based at least in part on selection from the content provider of content to offer subscribers and terms of subscriber. In some embodiments, controlling delivery of the content might include, without limitation, at least one of blocking user access to the content, allowing user access to the content on a charge per access basis, allowing user access to the content at reduced network access speeds, implementing application aware network management on per subscriber basis, implementing SDN, implementing DPI, implementing NFV with management and orchestration functions, implementing at least one of service chaining graphs or service forwarding graphs, implementing a virtual and/or hardware-based "walled garden" software platform or system, and/or the like.

According to some embodiments, the first computer might be associated with an Internet service provider, and the terms of subscriber offers might comprise one set of terms providing that, in exchange for one of a partial subsidy or a full subsidy, provided to a subscriber by the content provider, for Internet services for the subscriber, the subscriber agrees to be subject to restricted Internet service access to content associated with competitors of the content provider, the restricted Internet access being implemented by the Internet service provider.

The techniques of FIG. 11 are otherwise similar, if not identical to, the techniques as described above with respect to either FIG. 9 and/or FIG. 10, and the descriptions of the embodiment of FIGS. 9 and 10 may similarly applicable to those of the embodiment of FIG. 11 (unless incompatible, inconsistent, or otherwise stated as being different).

Figure 12:
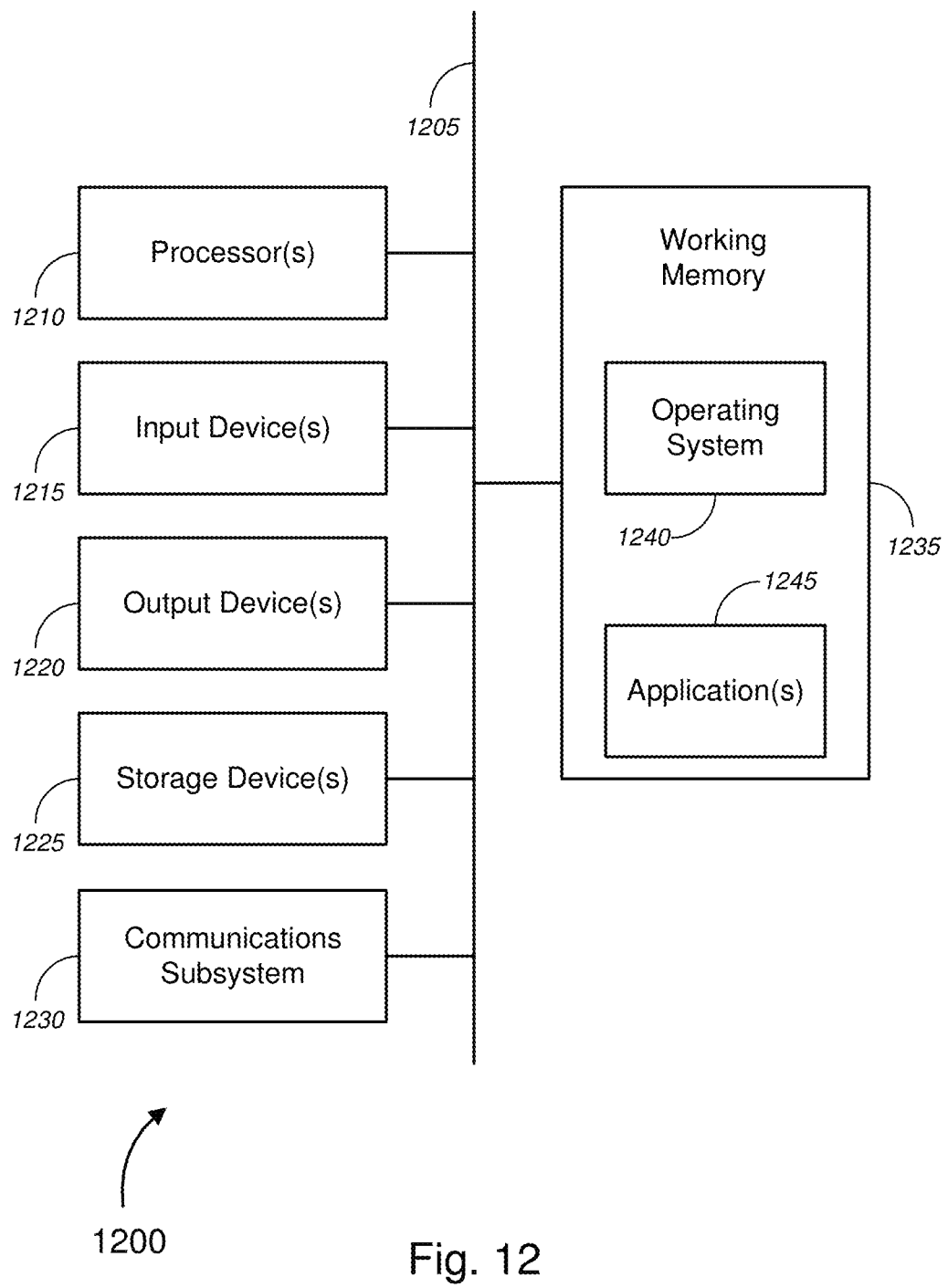
FIG. 12 is a block diagram illustrating an exemplary computer or system hardware architecture, in accordance with various embodiments.

FIG. 12 is a block diagram illustrating an exemplary computer or system hardware architecture, in accordance with various embodiments. FIG. 12 provides a schematic illustration of one embodiment of a computer system 1200 of the service provider system hardware that can perform the methods provided by various other embodiments, as described herein, and/or can perform the functions of computer or hardware system (i.e., host system) 115, 145, 155, 160, 205, 410, 415, and/or 420, or of any other device (e.g., user device 105 or 110, user device 405, etc.), and/or can function as a customer equipment, a user device, a user network interface ("UNI"), a network interface device ("NID"), an optical network terminal ("ONT"), a control server, an OAM server, server computer, a network management layer-configuration management ("NML-CM") controller, a layer 3/layer 2 flow domain ("L3/L2 FD") controller, a layer 3/layer 2 element management layer-configuration management ("L3/L2 EML-CM") controller, a NML-CM activation engine, a NML-CM modification engine, a service assurance engine, a fault isolation engine, a performance monitoring engine, a user-side provider edge ("U-PE") router, a network-side provider edge ("N-PE") router, or an internal network-to-network interface ("I-NNI") device, and/or the like, as described above. It should be noted that FIG. 12 is meant only to provide a generalized illustration of various components, of which one or more (or none) of each may be utilized as appropriate. FIG. 12, therefore, broadly illustrates how individual system elements may be implemented in a relatively separated or relatively more integrated manner.

The computer or hardware system 1200—which might represent an embodiment of the computer or hardware system or host system 115, 145, 155, 160, 205, 410, 415, and/or 420, or of any other device (e.g., user device 105 or 110, user device 405, etc.), described above with respect to FIGS. 1-5—is shown comprising hardware elements that can be electrically coupled via a bus 1205 (or may otherwise be in communication, as appropriate). The hardware elements may include one or more processors 1210, including, without limitation, one or more general-purpose processors and/or one or more special-purpose processors (such as digital signal processing chips, graphics acceleration processors, and/or the like); one or more input devices 1215, which can include, without limitation, a mouse, a keyboard and/or the like; and one or more output devices 1220, which can include, without limitation, a display device, a printer, and/or the like.

The computer or hardware system 1200 may further include (and/or be in communication with) one or more storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 1200 might also include a communications subsystem 1230, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1230 may permit data to be exchanged with a network (such as the network described below, to name one example), with other computer or hardware systems, and/or with any other devices described herein. In many embodiments, the computer or hardware system 1200 will further comprise a working memory 1235, which can include a RAM or ROM device, as described above.

The computer or hardware system 1200 also may comprise software elements, shown as being currently located within the working memory 1235, including an operating system 1240, device drivers, executable libraries, and/or other code, such as one or more application programs 1245, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1225 described above. In some cases, the storage medium might be incorporated within a computer system, such as the system 1200. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 1200 and/or might take the form of source and/or installable code, which, upon compilation and/or installation on the computer or hardware system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1200) to perform methods in accordance with various embodiments of the invention. According to a set of embodiments, some or all of the procedures of such methods are performed by the computer or hardware system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer readable medium, such as one or more of the storage device(s) 1225. Merely by way of example, execution of the sequences of instructions contained in the working memory 1235 might cause the processor(s) 1210 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1200, various computer readable media might be involved in providing instructions/code to processor(s) 1210 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1225. Volatile media includes, without limitation, dynamic memory, such as the working memory 1235. Transmission media includes, without limitation, coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1200. These signals, which might be in the form of electromagnetic signals, acoustic signals, optical signals, and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

Figure 13:
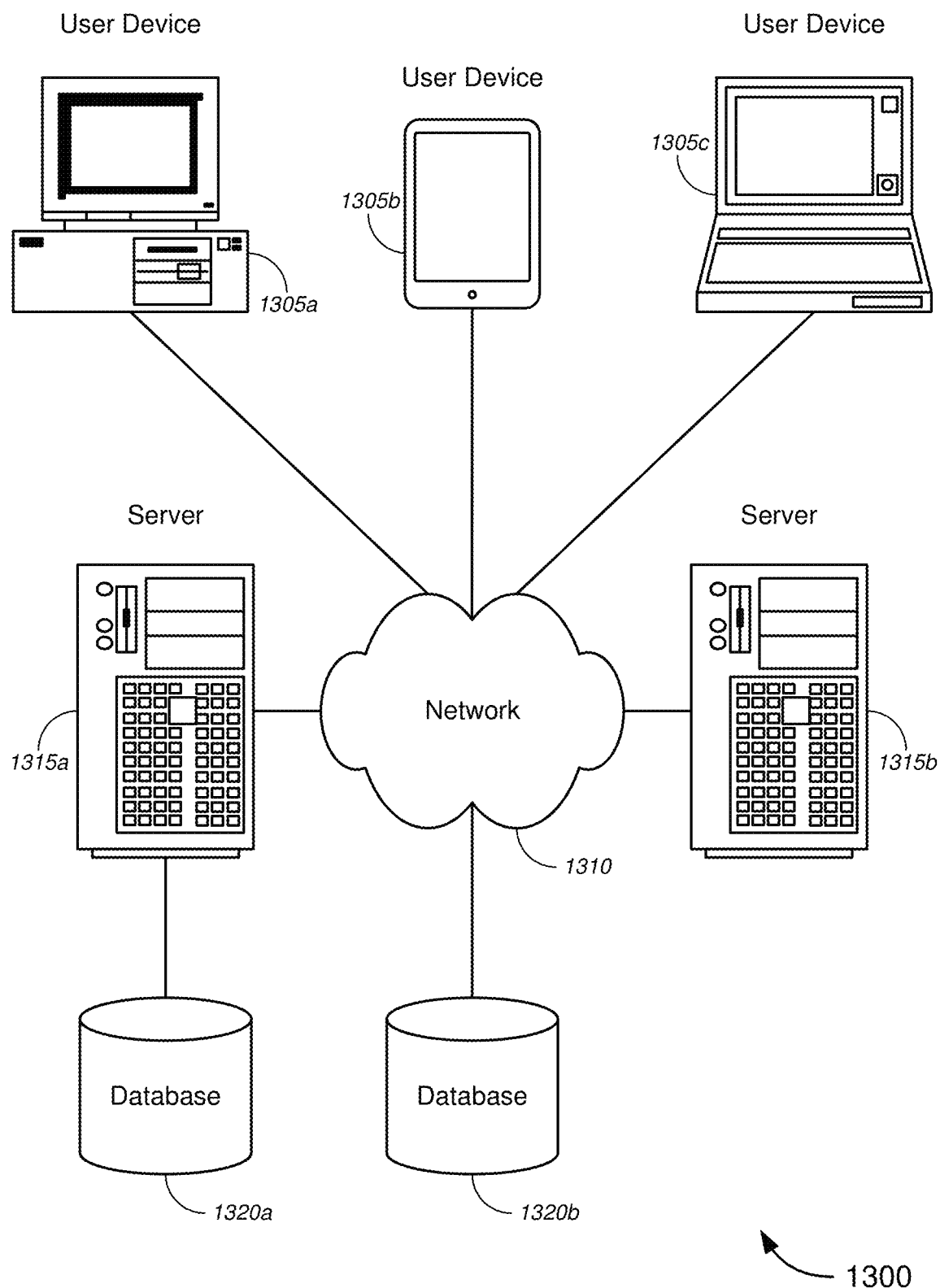
FIG. 13 is a block diagram illustrating a networked system of computers or computing systems, which can be used in accordance with various embodiments.

As noted above, a set of embodiments comprises methods and systems for implementing application and/or content access control, based at least in part on a consumer's choice of applications, content, and/or content providers. FIG. 13 illustrates a schematic diagram of a system 1300 that can be used in accordance with one set of embodiments. The system 1300 can include one or more user computers or user devices 1305. A user computer or user device 1305 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 1305 can also have any of a variety of applications, including one or more applications configured to perform methods provided by various embodiments (as described above, for example), as well as one or more office applications, database client and/or server applications, and/or web browser applications. Alternatively, a user computer or user device 1305 can be any other electronic device, such as a thin-client computer, Internet-enabled mobile telephone, and/or personal digital assistant, capable of communicating via a network (e.g., the network 1310 described below) and/or of displaying and navigating web pages or other types of electronic documents. Although the exemplary system 1300 is shown with three user computers or user devices 1305, any number of user computers or user devices can be supported.

Certain embodiments operate in a networked environment, which can include a network 1310. The network 1310 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network 1310 can include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1315. Each of the server computers 1315 may be configured with an operating system, including, without limitation, any of those discussed above, as well as any commercially (or freely) available server operating systems. Each of the servers 1315 may also be running one or more applications, which can be configured to provide services to one or more clients 1305 and/or other servers 1315.

Merely by way of example, one of the servers 1315 might be a data server, a web server, a cloud computing device(s), or the like, as described above. The data server might include (or be in communication with) a web server, which can be used, merely by way of example, to process requests for web pages or other electronic documents from user computers 1305. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1305 to perform methods of the invention.

The server computers 1315, in some embodiments, might include one or more application servers, which can be configured with one or more applications accessible by a client running on one or more of the client computers 1305 and/or other servers 1315. Merely by way of example, the server(s) 1315 can be one or more general purpose computers capable of executing programs or scripts in response to the user computers 1305 and/or other servers 1315, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 1305 and/or another server 1315. In some embodiments, an application server can perform one or more of the processes for implementing do not track or do not advertise functionality, or the like, as described in detail above. Data provided by an application server may be formatted as one or more web pages (comprising HTML, JavaScript, etc., for example) and/or may be forwarded to a user computer 1305 via a web server (as described above, for example). Similarly, a web server might receive web page requests and/or input data from a user computer 1305 and/or forward the web page requests and/or input data to an application server. In some cases, a web server may be integrated with an application server.

In accordance with further embodiments, one or more servers 1315 can function as a file server and/or can include one or more of the files (e.g., application code, data files, etc.) necessary to implement various disclosed methods, incorporated by an application running on a user computer 1305 and/or another server 1315. Alternatively, as those skilled in the art will appreciate, a file server can include all necessary files, allowing such an application to be invoked remotely by a user computer or user device 1305 and/or server 1315.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320. The location of the database(s) 1320 is discretionary: merely by way of example, a database 1320a might reside on a storage medium local to (and/or resident in) a server 1315a (and/or a user computer or user device 1305). Alternatively, a database 1320b can be remote from any or all of the computers 1305, 1315, so long as it can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the computers 1305, 1315 can be stored locally on the respective computer and/or remotely, as appropriate.) In one set of embodiments, the database 1320 can be a relational database, such as an Oracle database, that is adapted to store, update, and retrieve data in response to SQL-formatted commands. The database might be controlled and/or maintained by a database server, as described above, for example.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1300. These signals, which might be in the form of electromagnetic signals, acoustic signals, optical signals, and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1305 retrieves and executes the instructions. The instructions received by the working memory 1335 may optionally be stored on a storage device 1325 either before or after execution by the processor(s) 1310.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for providing a marketplace for consumers to choose at least one of content or content providers, the method comprising:
providing, with a first computer, a user interface for a user to choose content or content providers;
receiving, at a second computer over a network via the first computer and via the user interface, a selection from the user of at least one of one or more first content or one or more content providers, the one or more first content being associated with the one or more content providers;
receiving, at the second computer, a request from the user to access one or more second content;
determining, with the second computer, whether the one or more second content is associated with the one or more content providers;
based on a determination that the one or more second content is associated with the one or more content providers, relaying the request to a third computer to allow the user access to the one or more second content;
based on a determination that at least one second content of the one or more second content is not associated with any of the one or more content providers, restricting access, by the user, to the at least one second content;
wherein at least one of the second computer or the third computer is a server computer associated with an Internet service provider, wherein the content access agreement provides that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

2. The method of claim 1, wherein the one or more first content and the one or more second content each comprises at least one of applications, video content, audio content, image content, game content, website content, Internet search result content, application services, media content services, on-line services, or tangible services associated with one or more of application services, media content services, or on-line services.

3. The method of claim 1, wherein the first computer comprises a user device selected from a group consisting of a tablet computer, a smart phone, a mobile phone, a portable gaming device, a laptop computer, a desktop computer, a gaming console, a television, a digital video recorder, a set-top box, a media content presentation device, and a mobile user device interface apparatus.

4. The method of claim 1, wherein the user interface comprises a web portal.

5. The method of claim 1, wherein the second computer and the third computer are the same computer.

6. The method of claim 1, wherein at least one of the second computer or the third computer is a server computer associated with an access provider.

7. The method of claim 1, wherein the at least one second content comprises at least one of website content, Internet search result content, Internet-based media content services, or on-line services, wherein restricting access, by the user, to the at least one second content, based on a determination that at least one second content of the one or more second content is not associated with any of the one or more content providers, comprises one of:
blocking user access to the at least one of website content, Internet search result content, Internet-based media content services, or on-line services;
allowing user access to the at least one of website content, Internet search result content, Internet-based media content services, or on-line services, on a charge per access basis; or
allowing user access to the at least one of website content, Internet search result content, Internet-based media content services, or on-line services, at reduced network access speeds.

8. The method of claim 1, wherein restricting access, by the user, to the at least one second content comprises controlling delivery of the at least one first content.

9. The method of claim 8, wherein controlling delivery of the at least one second content comprises implementing application aware network management on per subscriber basis.

10. The method of claim 9, wherein controlling delivery of the at least one second content comprises implementing software defined networking ("SDN").

11. The method of claim 10, wherein controlling delivery of the at least one second content comprises implementing deep packet inspection ("DPI").

12. The method of claim 11, wherein controlling delivery of the at least one second content comprises implementing network functions virtualization ("NFV") with management and orchestration functions.

13. The method of claim 12, wherein controlling delivery of the at least one second content comprises implementing at least one of service chaining graphs or service forwarding graphs.

14. The method of claim 1, further comprising:
accessing, with the second computer and from a database over a network, a user profile associated with the user; and
determining, with the second computer, whether the user profile indicates that the user has entered into a content access agreement with one or more content providers.

15. The method of claim 14, wherein at least one of the second computer or the third computer is a server computer associated with an Internet service provider, wherein the content access agreement provides that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

16. An apparatus, comprising:
a non-transitory computer readable medium having encoded thereon a set of instructions executable by one or more computers to perform one or more operations, comprising:
receiving, at a first computer over a network via the first computer and via a user interface at a second computer, a selection from the user of at least one of one or more first content or one or more content providers, the one or more first content being associated with the one or more content providers;
receiving, at the first computer, a request from the user to access one or more second content;
determining, with the first computer, whether the one or more second content is associated with the one or more content providers;
based on a determination that the one or more second content is associated with the one or more content providers, relaying the request to a third computer to allow the user access to the one or more second content;
based on a determination that at least one second content of the one or more second content is not associated with any of the one or more content providers, restricting access, by the user, to the at least one second content;
wherein at least one of the second computer or the third computer is a server computer associated with an Internet service provider, wherein the content access agreement provides that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

17. A computer system, comprising:
one or more processors; and
a non-transitory computer readable medium in communication with the one or more processors, the computer readable medium having encoded thereon a set of instructions executable by the one or more processors to cause the computer system to perform one or more operations, comprising:
receiving, at a first computer over a network via the first computer and via a user interface at a second computer, a selection from the user of at least one of one or more first content or one or more content providers, the one or more first content being associated with the one or more content providers;
receiving, at the first computer, a request from the user to access one or more second content;
determining, with the first computer, whether the one or more second content is associated with the one or more content providers;
based on a determination that the one or more second content is associated with the one or more content providers, relaying the request to a third computer to allow the user access to the one or more second content;
based on a determination that at least one second content of the one or more second content is not associated with any of the one or more content providers, restricting access, by the user, to the at least one second content;
wherein at least one of the second computer or the third computer is a server computer associated with an Internet service provider, wherein the content access agreement provides that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

18. A method for providing a marketplace for consumers to choose at least one of content or content providers, the method comprising:
providing, with a first computer, a user interface for a user to choose content or content providers;
receiving, at a second computer over a network via the first computer and via the user interface, a selection from the user of at least one of one or more first content or one or more content providers, the one or more first content being associated with the one or more content providers;
receiving, at the second computer, a request from the user to access one or more second content;
determining, with the second computer, whether the one or more second content is associated with the one or more content providers;
based on a determination that the one or more second content is associated with the one or more content providers, relaying the request to a third computer to allow the user access to the one or more second content;
based on a determination that at least one second content of the one or more second content is not associated with any of the one or more content providers, restricting access, by the user, to the at least one second content;
further comprising:
accessing, with the second computer and from a database over a network, a user profile associated with the user; and
determining, with the second computer, whether the user profile indicates that the user has entered into a content access agreement with one or more content providers;
wherein at least one of the second computer or the third computer is a server computer associated with an Internet service provider, wherein the content access agreement provides that, in exchange for one of a partial subsidy or a full subsidy, provided to the user by the one or more content providers, for Internet services for the user, the user agrees to be subject to restricted Internet service access to content associated with competitors of the one or more content providers, the restricted Internet access being implemented by the Internet service provider.

\* \* \* \* \*